United States Patent
Sasaki et al.

(10) Patent No.: US 6,201,902 B1
(45) Date of Patent: Mar. 13, 2001

(54) INFORMATION REPRODUCING DEVICE FOR REPRODUCING MULTIMEDIA INFORMATION RECORDED IN THE FORM OF OPTICALLY READABLE CODE PATTERN, AND INFORMATION RECORDING MEDIUM STORING MULTIMEDIA INFORMATION IN THE SAME FORM

(76) Inventors: Hiroshi Sasaki, 101 Moriya-Heim 2, 96-4 Ishikawacho, Hachioji-shi, Tokyo; Hiroyoshi Fujimori, 5-7-8-203, Minamiosawa, Hachioji-shi, Tokyo; Shinichi Imade, 717-4, Mokurenji, Iruma-shi, Saitama-ken; Shinzo Matsui, 2776-78, Shiotsu, Uenoharamachi, Kitatsuru-gun, Yamanashi-ken; Takeshi Mori, 726, Kamioyamadamachi, Machida-shi, Tokyo, all of (JP)

( * ) Notice: Subject to any disclaimer, the term of this patent is extended or adjusted under 35 U.S.C. 154(b) by 0 days.

(21) Appl. No.: 09/501,404

(22) Filed: Feb. 10, 2000

Related U.S. Application Data

(60) Continuation of application No. 09/065,598, filed on Apr. 24, 1998, now Pat. No. 6,072,918, which is a division of application No. 08/519,339, filed on Aug. 28, 1995, now Pat. No. 5,774,583.

(30) Foreign Application Priority Data

Sep. 5, 1994 (JP) .................................. 6-211433

(51) Int. Cl.⁷ .................................................. G06K 9/03
(52) U.S. Cl. ........................................ 382/309; 382/317
(58) Field of Search .................................. 382/190, 302, 382/309, 311, 317; 235/437

(56) References Cited

U.S. PATENT DOCUMENTS

| 4,461,552 | 7/1984 | Lelvine | 352/27 |
|---|---|---|---|
| 5,101,096 | 3/1992 | Ohyama et al. | 235/436 |
| 5,394,249 | 2/1995 | Shimoda et al. | 358/335 |
| 5,452,097 | 9/1995 | Koga et al. | 358/342 |
| 5,566,379 | 10/1996 | Mawatari et al. | 369/48 |
| 5,644,557 | 7/1997 | Akamine et al. | 369/14 |
| 5,896,403 | 4/1999 | Nagasaki et al. | 371/37.1 |
| 5,898,709 | 4/1999 | Imade et al. | 371/40.11 |
| 5,920,661 | 6/1999 | Mori et al. | 382/317 |

FOREIGN PATENT DOCUMENTS

| 0713194 | 5/1996 | (EP) | G06K/19/00 |
|---|---|---|---|
| 0773511 | 5/1997 | (EP) | G06K/19/00 |
| WO 94/08314 | 4/1994 | (WO) | G06K/1/12 |

OTHER PUBLICATIONS

Patent Abstracts of Japan, vol. 018, No. 618 (P–1831), Nov. 24, 1994 and JP 06–231466A, Aug. 19, 1994.

Patent Abstracts of Japan, vol. 012, No. 180 (P–709), May 27, 1998 and JP 62–289936A, Dec. 16, 1997.

"Optical Sheet Memory System", Ohyama et al, *Electronics & Communications in Japan, Part II—Electronics*, vol. 75, No. 4, Apr. 1, 1992 (pp. 73–84).

*Primary Examiner*—Andrew W. Johns
(74) *Attorney, Agent, or Firm*—Frishauf, Holtz, Goodman, Langer & Chick, P.C.

(57) ABSTRACT

A code pattern of an information recording medium contains processing information necessary for editing data according to a restoration processing procedure for restoring multimedia information. The restoration processing procedure has a hierarchical structure of layers 1 to 5. The layer 5 has a file management function. The layer 4 has a function of collecting subset elements to create a subset and converting the same to create a data transfer unit or sector which the layer 5 deals with. The layer 3 or lower layer has a function of reading the code pattern from the information recording medium, subjecting the code pattern to a preset restoration process and outputting the subset elements.

3 Claims, 26 Drawing Sheets

FIG. 5A

SET SPECIFICATION IDENTIFYING CODE 96

| USER DATA FORMAT TYPE | BLOCK ADDRESS | BLOCK USER DATA SIZE | BLOCK USER DATA |
|---|---|---|---|
| 98 | 100 | 102 | 104 |

FIG. 5B

96 SET SPECIFICATION IDENTIFYING CODE

| USER DATA FORMAT TYPE | BLOCK ADDRESS | BLOCK ADDRESS ERROR STATUS FLAG | BLOCK USER DATA SIZE | BLOCK USER DATA |
|---|---|---|---|---|
| 98 | 100 | 106 | 102 | 104 |

FIG. 5C

96 SET SPECIFICATION IDENTIFYING CODE

| USER DATA FORMAT TYPE | BLOCK ADDRESS | BLOCK ADDRESS ERROR STATUS FLAG | BLOCK USER DATA SIZE | BLOCK USER DATA DEMODULATION ERROR NUMBER | BLOCK USER DATA |
|---|---|---|---|---|---|
| 98 | 100 | 106 | 102 | | 104 |

FIG. 5D

96 SET SPECIFICATION IDENTIFYING CODE

| USER DATA FORMAT TYPE | BLOCK ADDRESS | BLOCK ADDRESS ERROR STATUS FLAG | BLOCK USER DATA SIZE | BLOCK USER DATA DEMODULATION ERROR POSITION | BLOCK USER DATA |
|---|---|---|---|---|---|
| 98 | 100 | 106 | 102 | 108  110 | 104 |

FIG. 6

BLOCK ADDRESS ERROR STATUS FLAG 106

| STATUS | NO ERROR | VALID CORRECTION | VALID CORRECTION BY USE OF ADJACENT BLOCKS AFTER MISCORRECTION OR DECODING FAILURE | INVALID CORRECTION BY USE OF ADJACENT BLOCKS AFTER MISCORRECTION OR DECODING FAILURE |
|---|---|---|---|---|
| VALUE OF FLAG | 1 | 2 | 3 | 4 |

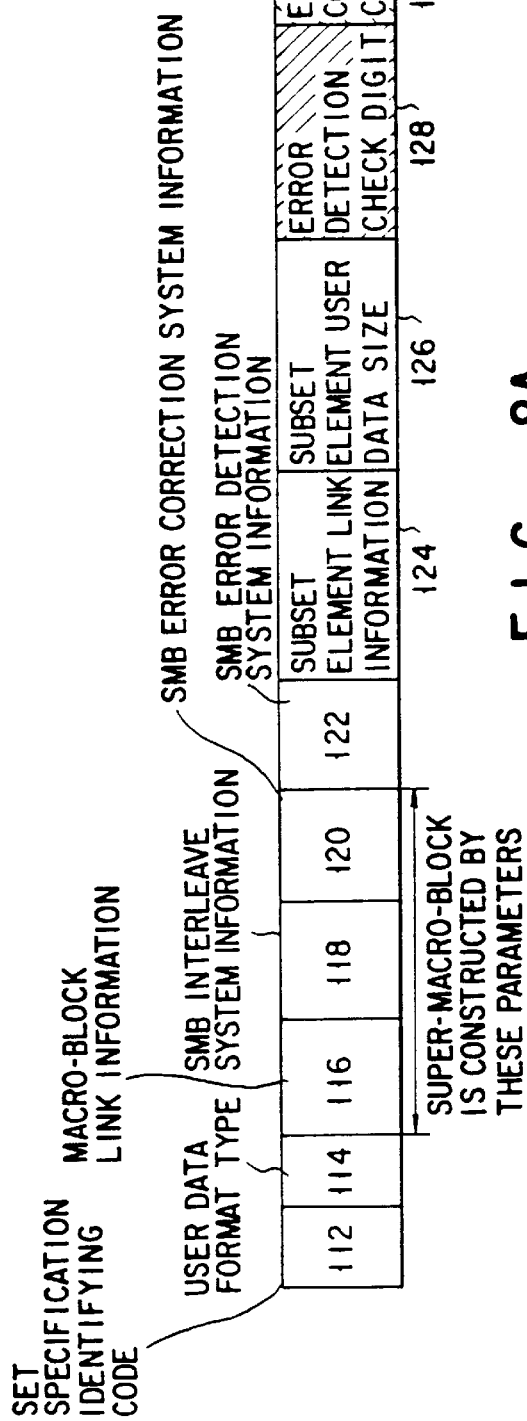
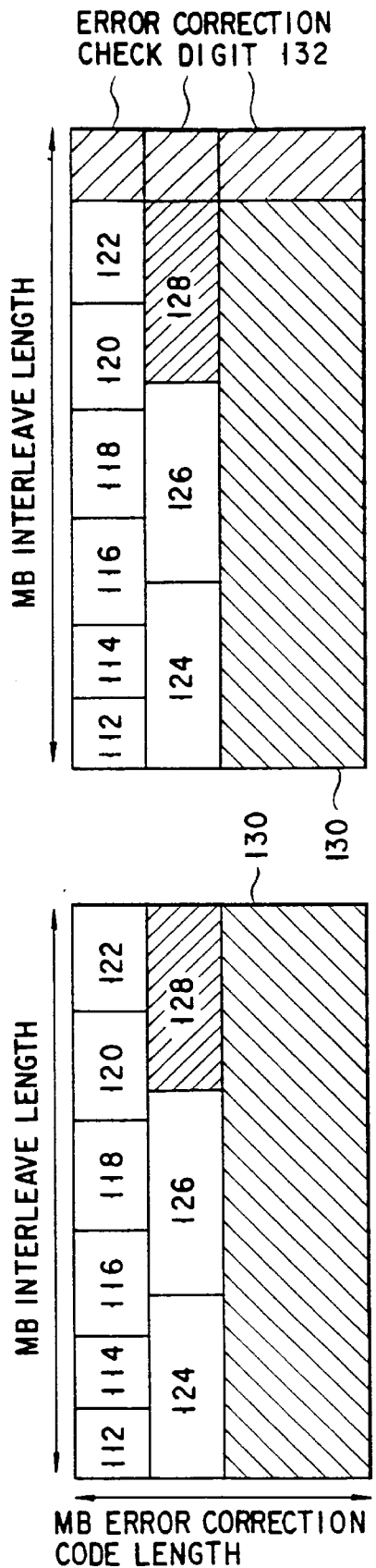

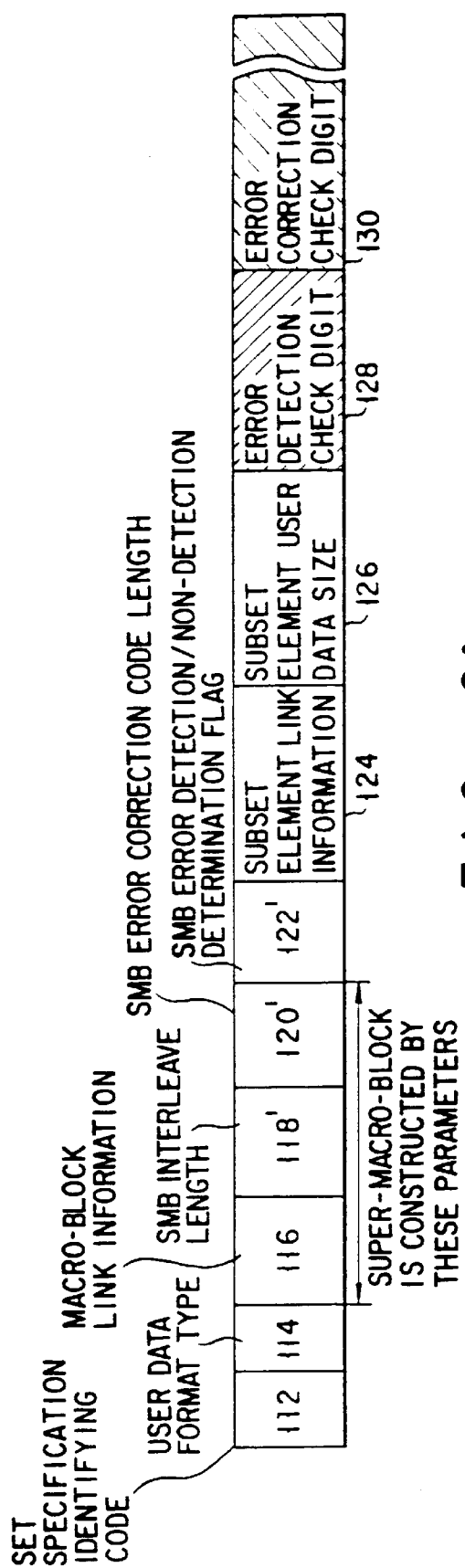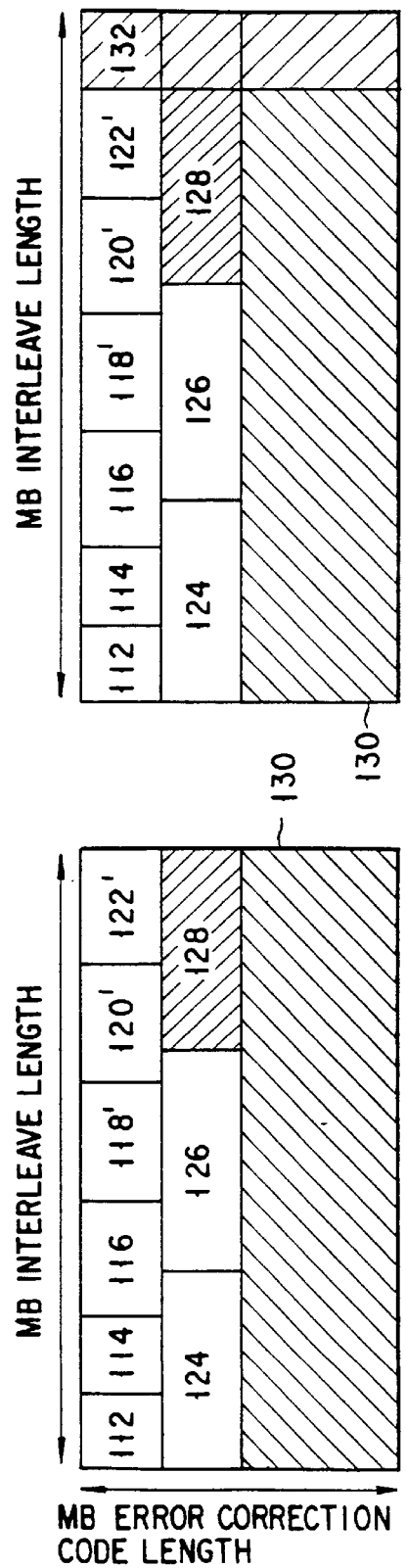

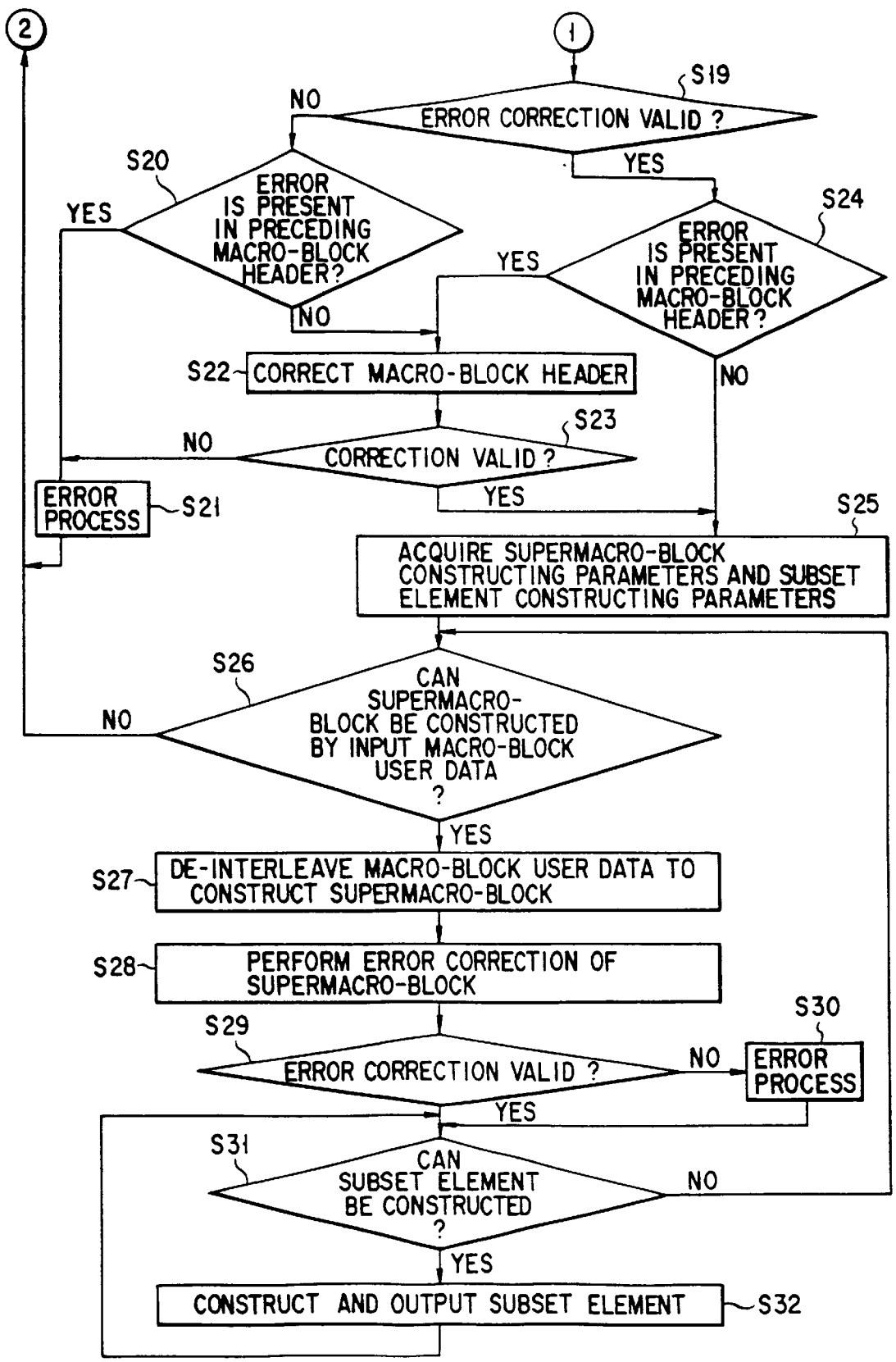
F I G. 13B

| PROTOCOL CONTROL INFORMATION | |
|---|---|
| SUBSET SPECIFICATION NAME IDENTIFIER (SET SPECIFICATION IDENTIFYING CODE) | ~164 |
| MMP FILE TYPE | ~166 |
| SUBSET ID | ~168 |
| SUBSET LINK INFORMATION | ~170 |
| ASSIGNED FILE ID | ~172 |
| PAGE NUMBER | ~174 |
| IN-PAGE POSITION | ~176 |
| BOOK ID | ~188 |
| DATA FORMAT TYPE (UFT) (FILE STRUCTURE SPECIFICATION RECOGNITION CODE) | ~190 |
| SUBSET DATA CONTROL HEADER (SDCH) (SPECIFICATION HEADER/USER REGISTRATION HEADER) | ~192 |
| USER DATA | ~194 |

F I G. 15B

| PROTOCOL CONTROL INFORMATION |
|---|
| SUBSET SPECIFICATION NAME IDENTIFIER (SET SPECIFICATION IDENTIFYING CODE) |
| MMP FILE TYPE |
| SUBSET ID |
| SUBSET LINK INFORMATION |
| ASSIGNED FILE ID |
| PAGE NUMBER |
| IN-PAGE POSITION |
| FILE NAME |
| FILE STRUCTURE TYPE (SINGLE FILE/SUBSET LINK STRUCTURE TYPE FILE) |
| DOS FILE TYPE (EXTENSION: IT MAY BE INCLUDED IN FILE NAME) |
| DOS FILE ATTRIBUTE (READ ONLY FILE/HIDDEN FILE, ETC.) |
| BOOK NAME |
| BOOK ID |
| DATA FORMAT TYPE (UFT) (FILE STRUCTURE SPECIFICATION RECOGNITION CODE) |
| SUBSET DATA CONTROL HEADER (SDCH) (SPECIFICATION HEADER/USER REGISTRATION HEADER) |
| USER DATA |

F I G. 17A

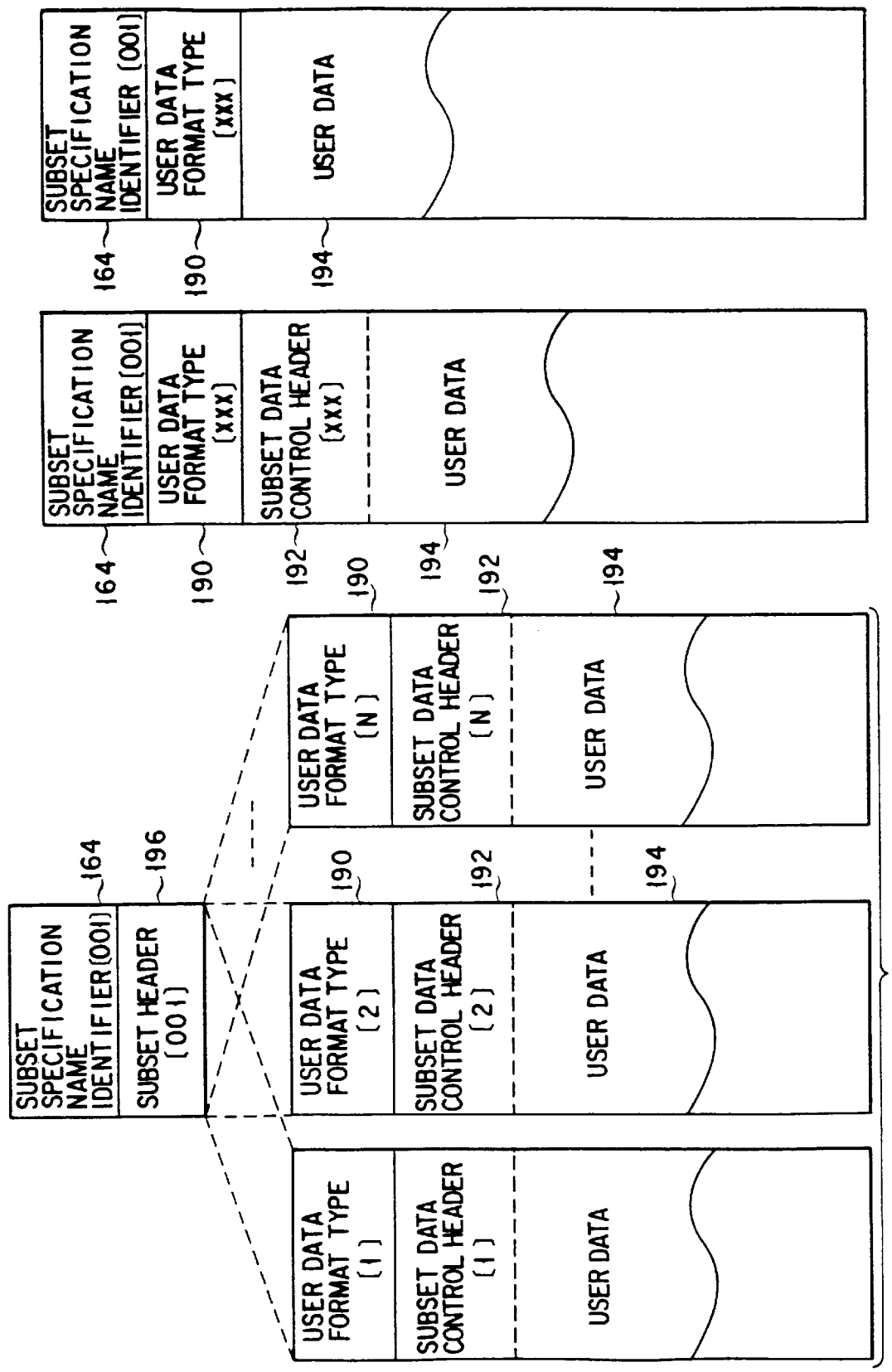

| PROTOCOL CONTROL INFORMATION |
|---|
| SUBSET SPECIFICATION NAME IDENTIFIER (SET SPECIFICATION IDENTIFYING CODE) |
| MMP FILE TYPE |
| SUBSET ID |
| SUBSET LINK INFORMATION |
| ASSIGNED FILE ID |
| PAGE NUMBER |
| IN-PAGE POSITION |
| BOOK ID |
| DATA FORMAT TYPE (UFT) (FILE STRUCTURE SPECIFICATION RECOGNITION CODE) |
| SUBSET DATA CONTROL HEADER (SDCH) (SPECIFICATION HEADER/USER REGISTRATION HEADER) |
| USER DATA |
| ⋮ |
| PROTOCOL CONTROL INFORMATION |
| SUBSET SPECIFICATION NAME IDENTIFIER (SET SPECIFICATION IDENTIFYING CODE) |
| MMP FILE TYPE |
| SUBSET ID |
| SUBSET LINK INFORMATION |
| ASSIGNED FILE ID |
| PAGE NUMBER |
| IN-PAGE POSITION |
| BOOK ID |
| DATA FORMAT TYPE (UFT) (FILE STRUCTURE SPECIFICATION RECOGNITION CODE) |
| SUBSET DATA CONTROL HEADER (SDCH) (SPECIFICATION HEADER/USER REGISTRATION HEADER) |
| USER DATA |

FIG. 17B

| PROTOCOL CONTROL INFORMATION |
| --- |
| SUBSET SPECIFICATION NAME IDENTIFIER (SET SPECIFICATION IDENTIFYING CODE) |
| MMP FILE TYPE |
| SUBSET ID |
| SUBSET LINK INFORMATION |
| ASSIGNED FILE ID |
| PAGE NUMBER |
| IN-PAGE POSITION |
| FILE NAME |
| FILE STRUCTURE TYPE (SINGLE FILE/SUBSET LINK STRUCTURE TYPE FILE) |
| BOOK NAME |
| BOOK ID |

DATA FORMAT TYPE (UFT)=INDEX FILE TYPE
(FILE STRUCTURE SPECIFICATION RECOGNITION CODE)

USER DATA

FILE NAME
DOS FILE TYPE (EXTENTION)
DOS FILE ATTRIBUTE (READ ONLY FILE ETC.)
FILE CREATION HOUR
FILE CREATION DATE, MONTH, YEAR
FIRST PAGE NUMBER, IN-PAGE POSITION OF
                              CORRESPONDING FILE
FILE SIZE
FAT ID ~198

FILE NAME
DOS FILE TYPE (EXTENTION)
DOS FILE ATTRIBUTE (READ ONLY FILE ETC.)
FILE CREATION HOUR
FILE CREATION DATE, MONTH, YEAR
FIRST PAGE NUMBER, IN-PAGE POSITION OF
                              CORRESPONDING FILE
FILE SIZE ~198

FILE NAME
DOS FILE TYPE (EXTENTION)
DOS FILE ATTRIBUTE (READ ONLY FILE ETC.)
FILE CREATION HOUR
FILE CREATION DATE, MONTH, YEAR
FIRST PAGE NUMBER, IN-PAGE POSITION OF
                              CORRESPONDING FILE
FILE SIZE ~198

⋮

F I G. 17C

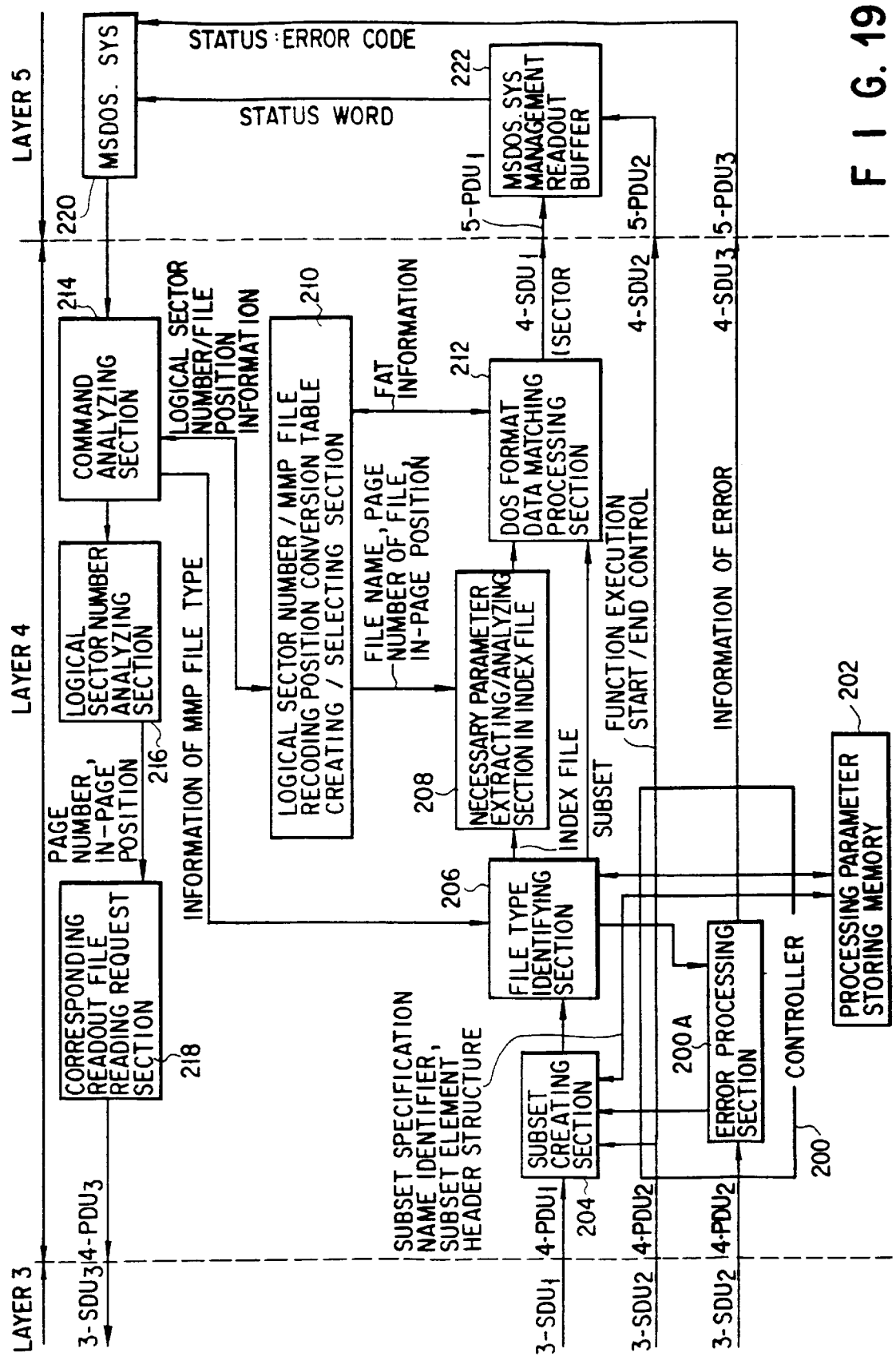
F I G. 19

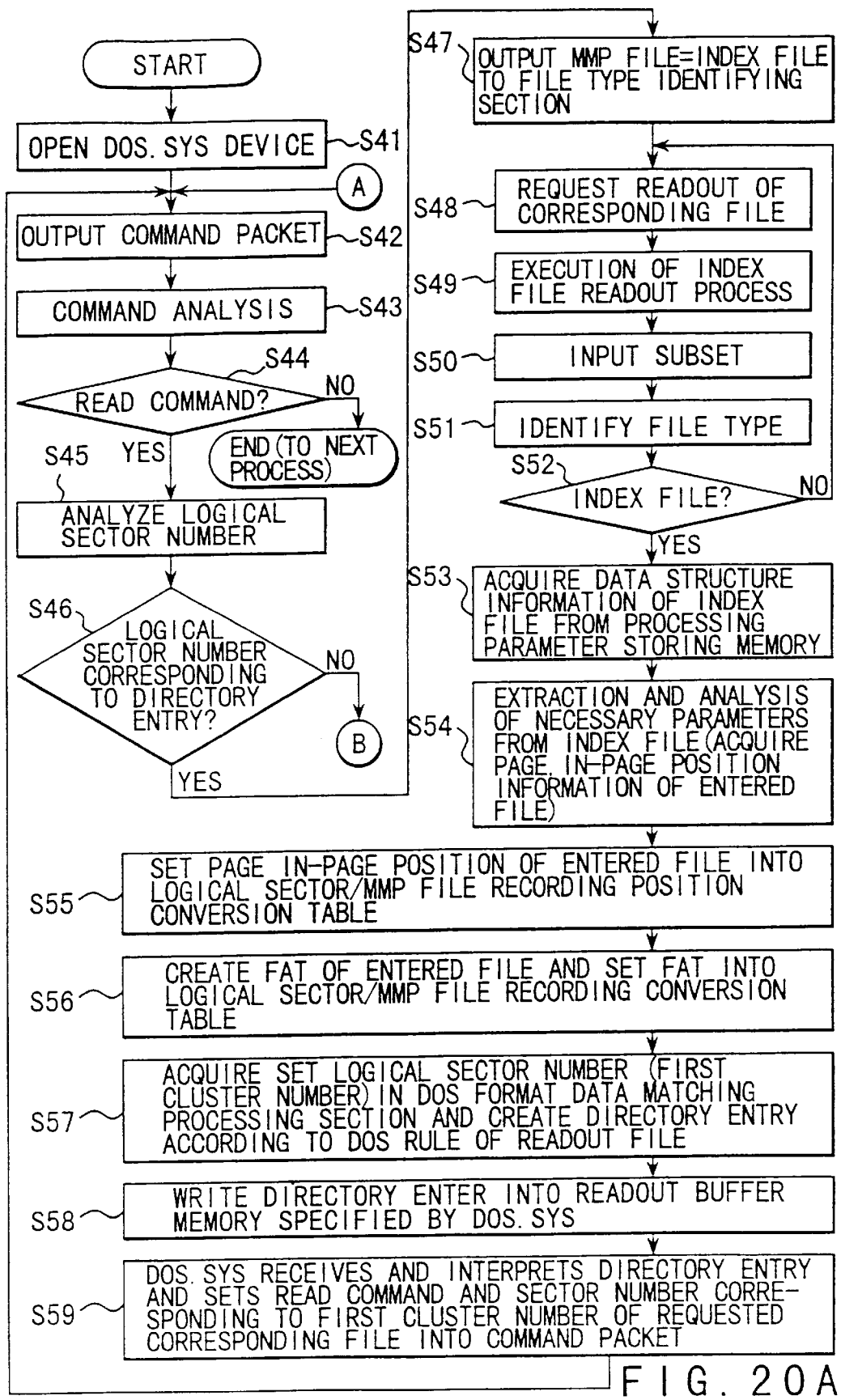
F I G. 20A

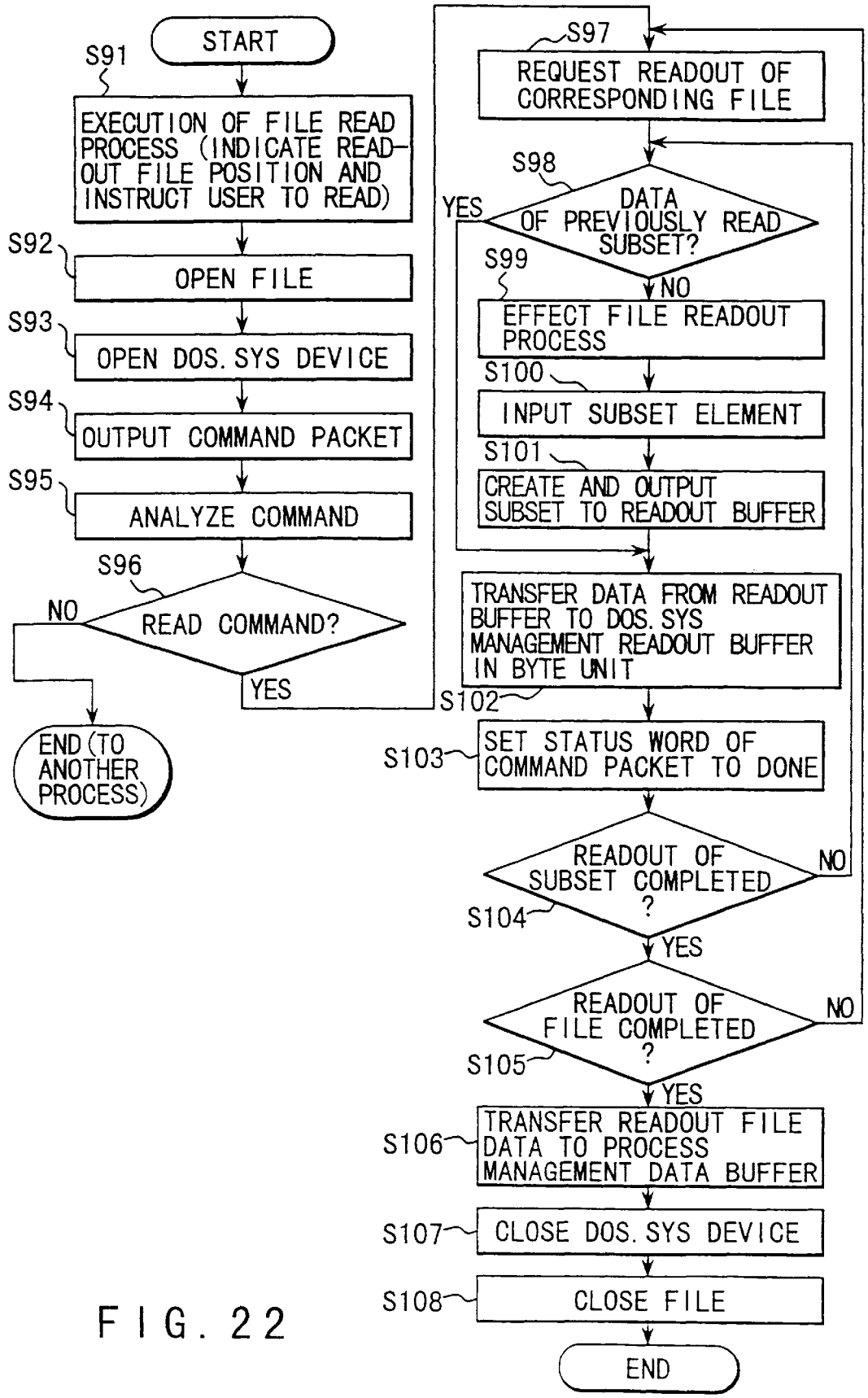
F I G. 22

INFORMATION REPRODUCING DEVICE FOR REPRODUCING MULTIMEDIA INFORMATION RECORDED IN THE FORM OF OPTICALLY READABLE CODE PATTERN, AND INFORMATION RECORDING MEDIUM STORING MULTIMEDIA INFORMATION IN THE SAME FORM

This is a continuation of application Ser. No. 09/065,598 filed Apr. 24, 1998, U.S. Pat. No. 6,072,918, which is a Divisional of application Ser. No. 08/519,339, now U.S. Pat. 5,774,583.

BACKGROUND OF THE INVENTION

1. Field of the Invention

This invention relates to an information recording medium such as paper for recording so-called multimedia information containing audio information such as voices and music, video information obtained by a camera, video device or the like, and digital code data obtained by a personal computer, word processor or the like in the form of optically readable code pattern, and an information reproducing device for optically reading a code pattern recorded on the information recording medium and reproducing the original multimedia information.

2. Description of the Related Art

Conventionally, as recording media for recording voices and music, various types of media such as a magnetic tape and optical disk are known. However, unit price of the media becomes expensive to some extent even if a large number of duplicates thereof are made and a large space for storing them is necessary. Further, in a case where it becomes necessary to give a medium recording sounds thereon to another person in a remote place, a lot of labor and time is taken either when it is sent by post or when it is directly handed over. Further, this is also true of so-called multimedia information containing video information obtained by a camera, video device or the like, and digital code data obtained from a personal computer, word processor or the like other than audio information.

Therefore, a group containing some of the inventors of this invention invented a system for recording multimedia information containing at least one of audio information, video information, digital code data on an information recording medium such as paper in the form of dot code as coded information or image information which can be sent by facsimile transmission and which can be duplicated in large quantities at low cost and a system for reproducing the information and obtained U.S. Pat. No. 5,846,103.

In the information reproducing system in the above International Application, a method of holding by hand an information reproducing device for optically reading and reproducing dot codes on the information recording medium, and manually scanning the device on the recording medium along the dot codes to read the dot codes is disclosed.

However, the dot code pattern itself remains in a stage in which the structure for enhancing the recording density is studied, and the information reproducing device and information recording medium in the above International Application are provided without fully taking the flexibility for the future change into consideration.

To reliably reproduce the code pattern is expected.

SUMMARY OF THE INVENTION

This invention has been made in order to solve the above problems, and an object of this invention is to provide an information reproducing device and information recording medium capable of reliably reproducing code patterns and dealing with code patterns even if the code pattern structure itself is changed in the future.

According to one aspect of this invention, there is provided an information reproducing device comprising first hierarchical processing means for optically reading a code pattern from an information recording medium having a portion in which multimedia information containing at least one of audio information, video information and digital code data is recorded in the form of code pattern which can be optically read, converting the code thus read into code data as an image, adding information relating to the reading as first processing information to the code data and then outputting the same; second hierarchical processing means for recognizing first processing information output from the first hierarchical processing means to process code data output from the first hierarchical processing means and creating blocks by collecting the code data for each given unit and outputting the blocks; third hierarchical processing means for extracting second processing information at least necessary for creating supermacro-blocks of a larger given unit by collecting the blocks output from the second hierarchical processing means from the code data of the blocks and recognizing the thus extracted data, creating supermacro-blocks based on the second processing information, extracting third processing information for effecting the process of coping with the error from the supermacro-block and recognizing the thus extracted third processing information, effecting the process of coping with the error of the supermacro-block based on the third processing information, and outputting subset elements created by distributing the supermacro-block based on the third processing information; fourth hierarchical processing means for extracting fourth processing information at least necessary for creating a subset from the subset elements output from the third hierarchical processing means from the subset element and outputting a subset created based on the fourth processing information, the subset being constructed by codes of a given unit which permits the multimedia information to be restored; and output means for outputting the subset output from the fourth hierarchical processing means as the restored multimedia information, wherein the third hierarchical processing means includes block code data linking means for re-constructing code data of the block by the second processing information; macro-block header constructing means for collecting a plurality of blocks of first data provided in given positions in the respective block code data linked by the block code data linking means to construct macro-block header information; and supermacro-block constructing means for collecting second data other than the first data in the respective block code data to construct the supermacro-block according to the macro-block header information constructed by the macro-block header constructing means.

According to another aspect of this invention, there is provided an information reproducing device comprising first hierarchical processing means for optically reading a code pattern from an information recording medium having a portion in which multimedia information containing at least one of audio information, video information and digital code data is recorded in the form of code pattern which can be optically read, converting the code thus read into code data as an image, adding information relating to the reading as first processing information to the code data and then outputting the same; second hierarchical processing means for recognizing first processing information output from the first hierarchical processing means to process code data output from the first hierarchical processing means and creating blocks by collecting the code data for each given unit and outputting the blocks; third hierarchical processing means for extracting second processing information at least necessary for creating supermacro-blocks of a larger given unit by collecting the blocks output from the second hierarchical processing means from the code data of the blocks and recognizing the thus extracted data, creating supermacro-blocks based on the second processing information, extracting third processing information for effecting the process of coping with the error from the supermacro-block and recognizing the thus extracted third processing information, effecting the process of coping with the error of the supermacro-block based on the third processing information, and outputting subset elements created by distributing the supermacro-block based on the third processing information; fourth hierarchical processing means for extracting fourth processing information at least necessary for creating a subset from the subset elements output from the third hierarchical processing means from the subset element and outputting a subset created based on the fourth processing information, the subset being constructed by codes of a given unit which permits the multimedia information to be restored; and output means for outputting the subset output from the fourth hierarchical processing means as the restored multimedia information, wherein the third hierarchical processing means includes block code data linking means for re-constructing block code data by the second processing information; macro-block header constructing means for collecting a plurality of blocks of first data provided in given positions in the respective block code data linked by the block code data linking means to construct a macro-block header; macro-block header error correction means for subjecting the macro-block header constructed by the macro-block header constructing means to an error correction process; macro-block correcting means for correcting for an uncorrectable portion which could not corrected by the macro-block header error correction means according to a proximity macro-block header; supermacro-block constructing means for linking second data other than the first data in the respective block code data to construct a supermacro-block based on the macro-block header information subjected to the error correction by the macro-block header correction means or corrected for by the macro-block correcting means; supermacro-block error correction means for subjecting a supermacro-block constructed by the supermacro-block constructing means to error correction; and subset element constructing means for dividing and linking the supermacro-block corrected by the supermacro-block error correction means to construct a subset element.

According to still another aspect of this invention, there is provided an information recording medium comprising a sheet-form medium; and an optically readable code pattern corresponding to multimedia information containing at least one of audio information, video information and digital code data recorded on the sheet-form medium; wherein the code pattern contains processing information necessary for editing data according to a restoring processing procedure of reading the code pattern and restoring original multimedia information, the restoring processing procedure is constructed in a hierarchical form with a given number of hierarchical structures, and the hierarchical structure at least includes a first logical hierarchy having a file managing function; a second logical hierarchy having a function of creating a data transfer unit treated by the first logical hierarchy by collecting first given data units and creating and converting a second given data unit; and a third logical hierarchy having a function of reading the code pattern from the information recording medium, subjecting the code pattern to a given restoring process, and outputting the first given data unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 5A to FIG. 5D are diagrams showing an example of the structure of block data supplied from the layer 2;

FIG. 6 is a diagram showing four states of a block address error status flag;

FIG. 8A is a diagram showing an example of the structure of a macro-block header, FIG. 8B is a diagram showing the actual two-dimensional structure of the macro-block header of FIG. 8A, and FIG. 8C is a diagram showing a modification of the structure of FIG. 8B;

FIG. 9A is a diagram showing an example of the more concrete structure of a macro-block header, FIG. 9B is a diagram showing the actual two-dimensional structure of the macro-block header of FIG. 9A, and FIG. 9C is a diagram showing a modification of the structure of FIG. 9B;

FIGS. 13A and 13B are diagrams showing a sequence of flowcharts for illustrating the operation of the layer 3;

FIG. 15A is a diagram showing an example of the structure of the head subset of a file and FIG. 15B is a diagram showing an example of the structure of a general subset of the file;

FIGS. 16A to 16C are diagrams showing examples of the constructions of subset formats;

FIGS. 17A and 17B are diagrams showing an example of the structure of a subset of a general file and FIG. 17C is a diagram showing an example of the structure of a subset of an index file;

FIG. 19 is a functional block diagram showing the construction of the layers 4 and 5 when viewing the MMP reproducing device as a block type device;

FIGS. 20A to 20C are diagrams showing a sequence of flowcharts for illustrating the operation of the construction of FIG. 19;

FIG. 22 is a flowchart for illustrating the operation of the construction of FIG. 21.

DETAILED DESCRIPTION OF THE PREFERRED EMBODIMENT

Before describing an embodiment of this invention, the code pattern of a dot code described in detail in International Application No. PCT/JP93/01377 (International Application KOKAI Publication No. WO 94/08314) is first explained.

Figure 1A:
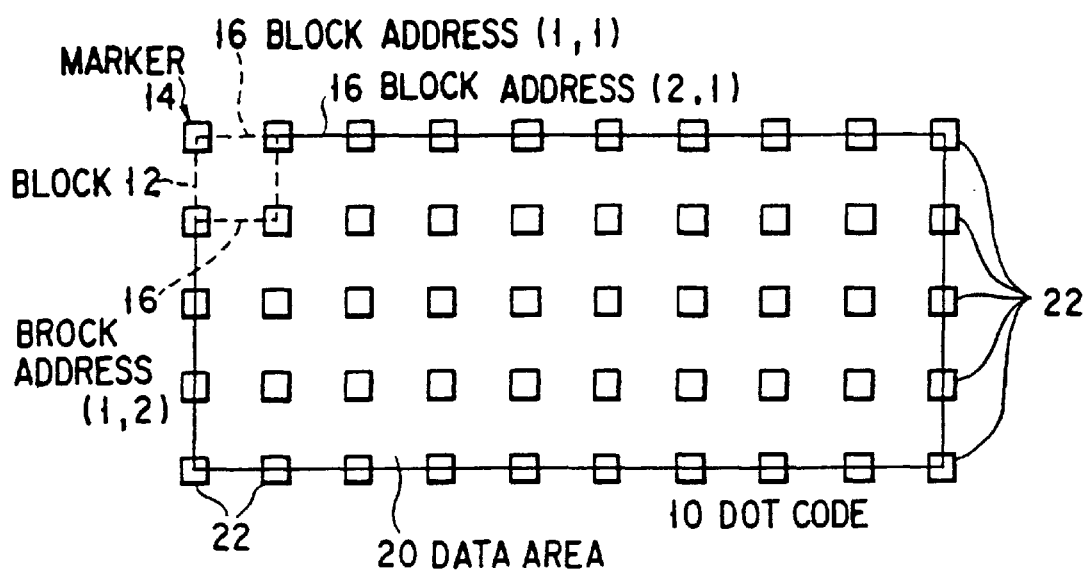
FIG. 1A and FIG. 1B are diagrams showing the format of a dot code.
Figure 1B:
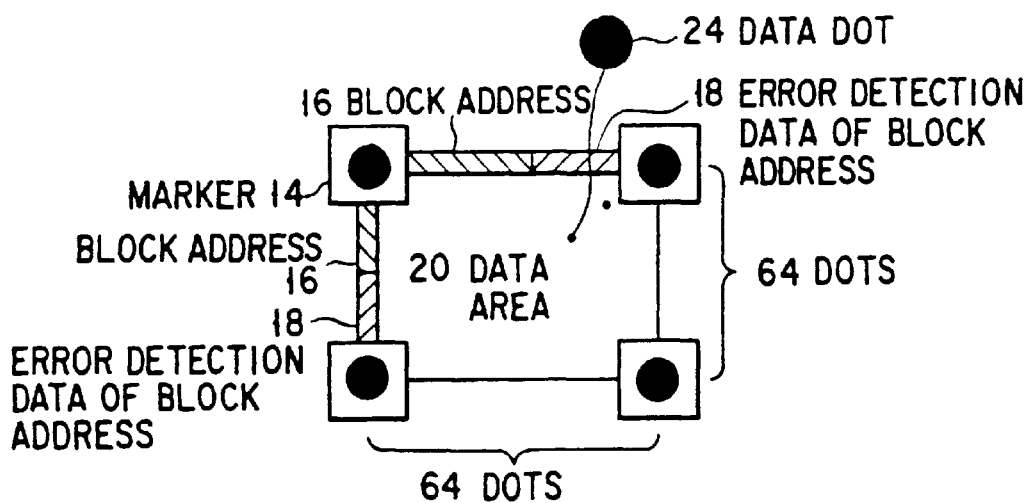

As shown in FIGS. 1A and 1B, a dot code 10 is constructed by arranging a plurality of blocks 12 each of which is constructed by a plurality of dots arranged according to the content of data. That is, the blocks 12 which are treated as data for every given unit are collectively arranged. Each of the blocks 12 is constructed by a marker 14, block addresses 16, address error detection data 18, and a data area 20 into which actual data is set.

The blocks 12 constructing the dot code 10 are arranged in a two-dimensional form and the block addresses 16 are added to each of the blocks. An address for the X and Y addresses is attached to the block address 16. For example, in FIG. 1A, the X and Y addresses of a block lying in the uppermost and leftmost position are set to (1, 1). The block address of a block lying on the right side of the above block is set to (2, 1). In the same manner, a block address obtained by incrementing the X address for a block lying in the farther position in the right direction and incrementing the Y address for a block lying in the farther position in the downward direction is attached to the block, and thus the block address 16 is attached to each of the blocks 12.

Markers lying in the downmost position and markers lying in the rightmost position are treated as dummy markers 22. That is, the block 12 for one of the markers 14 is data in an area surrounded by four markers 14 containing the above marker and lying in the lower right position with respect to the above marker, and the markers in the lowermost position and rightmost position are auxiliary markers arranged to define the blocks lying in the second positions from the lowermost and rightmost positions, that is, dummy markers 22.

Next, the content of the block 12 is explained. As shown in FIG. 1B, a block address 16 and error detection data 18 of the block address are attached between the marker 14 of the block 12 and a lower marker thereof. Likewise, a block address 16 and error detection data 18 of the block address are attached between the marker 14 of the block 12 and a marker on the right side thereof. Thus, the block addresses 16 are arranged on the left side and upper side of the data area 20 and the marker 14 is arranged on the upper left corner of the data area. In this case, an example in which the block addresses 16 are recorded on two portions of one block is shown, but it is possible to record the block address in one portion. However, if the block addresses are recorded on two portions, the block address can be reliably detected by detecting one of the two block addresses even if noise is superposed on the other block address and an error occurs, and therefore, it is preferable to record the block addresses in two portions.

By using the above-described two-dimensional block division system, the advantages that it can easily attain the enlargement, reduction, and deformation and cope with unintentional movement of hands can be attained since normalization is effected by detecting four adjacent markers and equally dividing a marker-to-marker portion by the number of dots on the information reproducing device side.

The each of data dots 24 in the data area 20 has the dot size of several ten $\mu$m, for example. The size of the data dot may be reduced to several $\mu$m depending on applications or purposes of usage, but in general, the size is set to 40 $\mu$m, 20 $\mu$m or 80 $\mu$m. For example, the data area 20 has the size of 64×64 dots. The sizes can be freely enlarged or reduced in a range in which an error caused by the equal division can be neglected. The marker 14 has a function of position index and is set to have the size which modulated data does not have, and may be formed in a circular form with the size of seven or more dots of the data dots 24, for example, or formed as a black circular mark with the size of approx. 7×7 dots. The block address 16 and error detection data 18 are constructed by the same dots as the data dots 24.

Next, an explanation is made for an example of hierarchical segmentation of information transfer protocol in a multimedia paper (MMP) system for recording or reproducing multimedia information in the form of dot pattern code as one example of an optically readable code pattern on or from an information recording medium such as paper as is described in detail in U.S. Pat. No. 5,898,709. In this case, the layer N (N=1 to 5) protocol is an operational rule for realizing a function necessary for the layer N to comply with a request from the adjacent layer.

Figure 2:
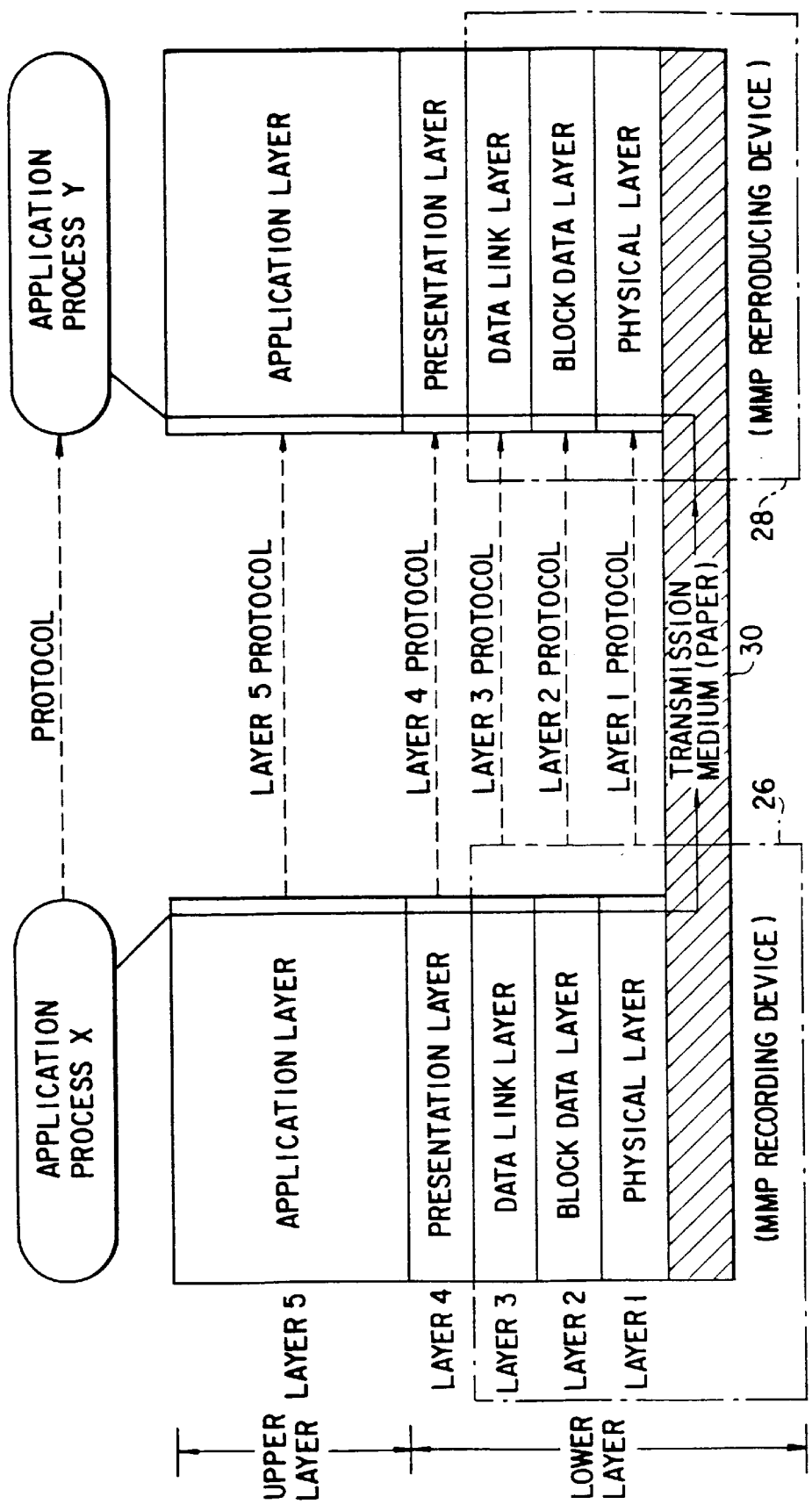
FIG. 2 is a diagram showing an example of hierarchical segmentation of an information transfer protocol in a multimedia paper (MMP) system.

As shown in FIG. 2, the hierarchical segmentation includes a plurality of logical hierarchical structures of the layers 1 to 5 on both of the recording and reproducing sides.

On the recording side, so-called multimedia information, caused in an application process X, generally, an application program on the computer, containing audio information such as voices and music, video information derived from a camera or video device, and digital code data obtained from a personal computer or word processor is transferred to an MMP recording device 26 used as an information recording device via the application layer (layer 5) and presentation layer (layer 4) constructed on the computer. In the MMP recording device, received data is printed or recorded on an information recording medium (transmission medium) 30 such as paper as an optically readable dot code pattern by the data link layer (layer 3), block data layer (layer 2) and physical layer (layer 1).

The information recording medium (transmission medium) 30 is handed over to the reproducing side. Alternatively, the code pattern recorded on the medium 30 can be sent to the reproducing side by facsimile and printed or recorded on the information recording medium 30 such as paper on the reproducing side.

In the MMP reproducing device 28, the code pattern recorded on the information recording medium 30 is photographed, the data editing process is effected according to the restoring processing procedure from the layer 1 to the layer 3 or to the layer 5 in the reverse order of the order at the recording time, and resultant data is given to the reproducing side computer. In the reproducing side computer, reproduced multimedia information is given to the application process (application program) Y via the processing function of the layers 4 and 5, if necessary, in the reverse order of the order on the recording side.

Next, each layer (hierarchy) of the reproducing side is explained in detail, and since the layers of the recording side are just opposite to those of the reproducing side, the explanation therefor is omitted.

Figure 3A:
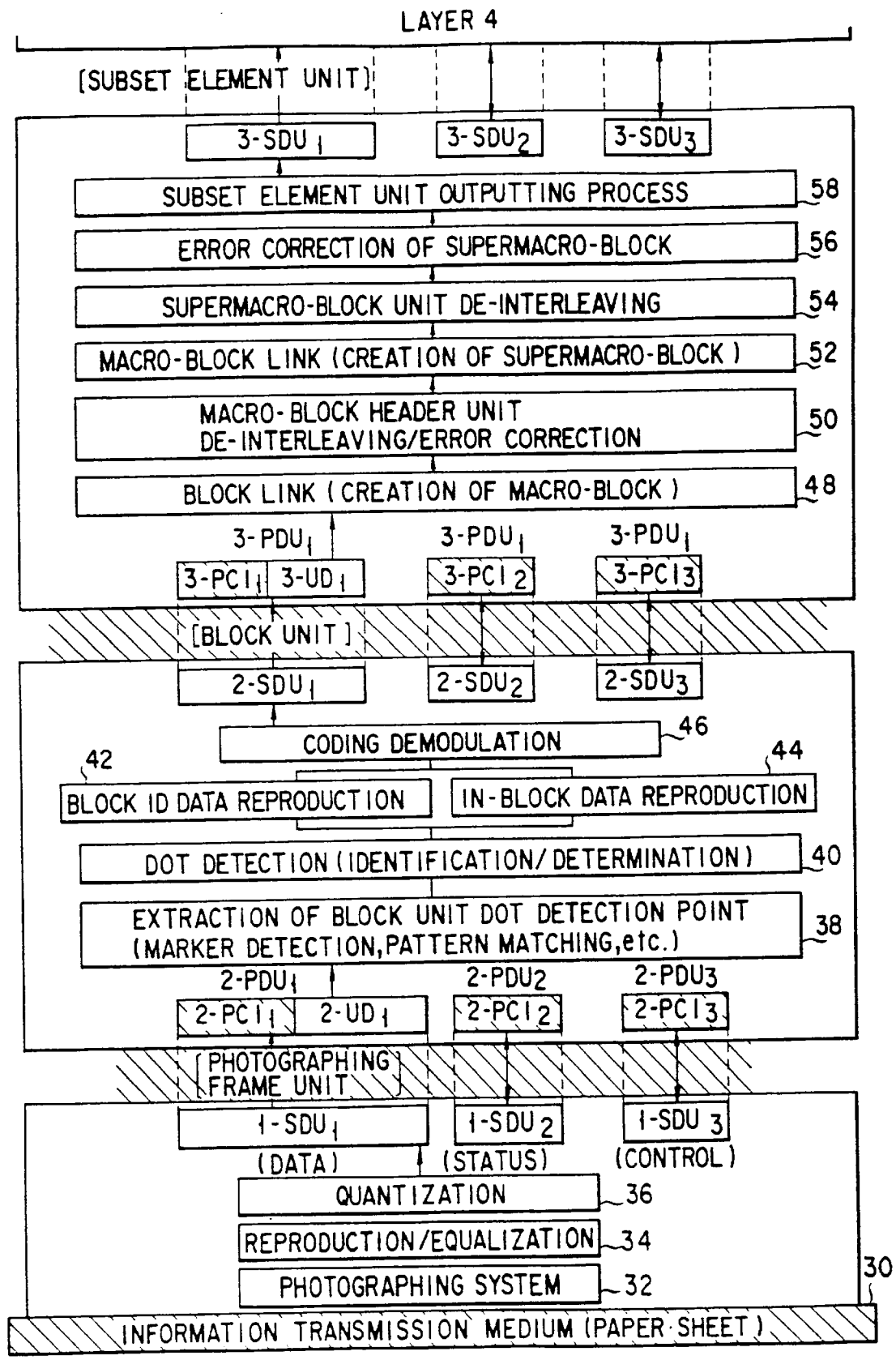
FIG. 3A and FIG. 3B are diagrams showing an example of the construction of a hierarchical structure on the reproducing side.
Figure 3B:
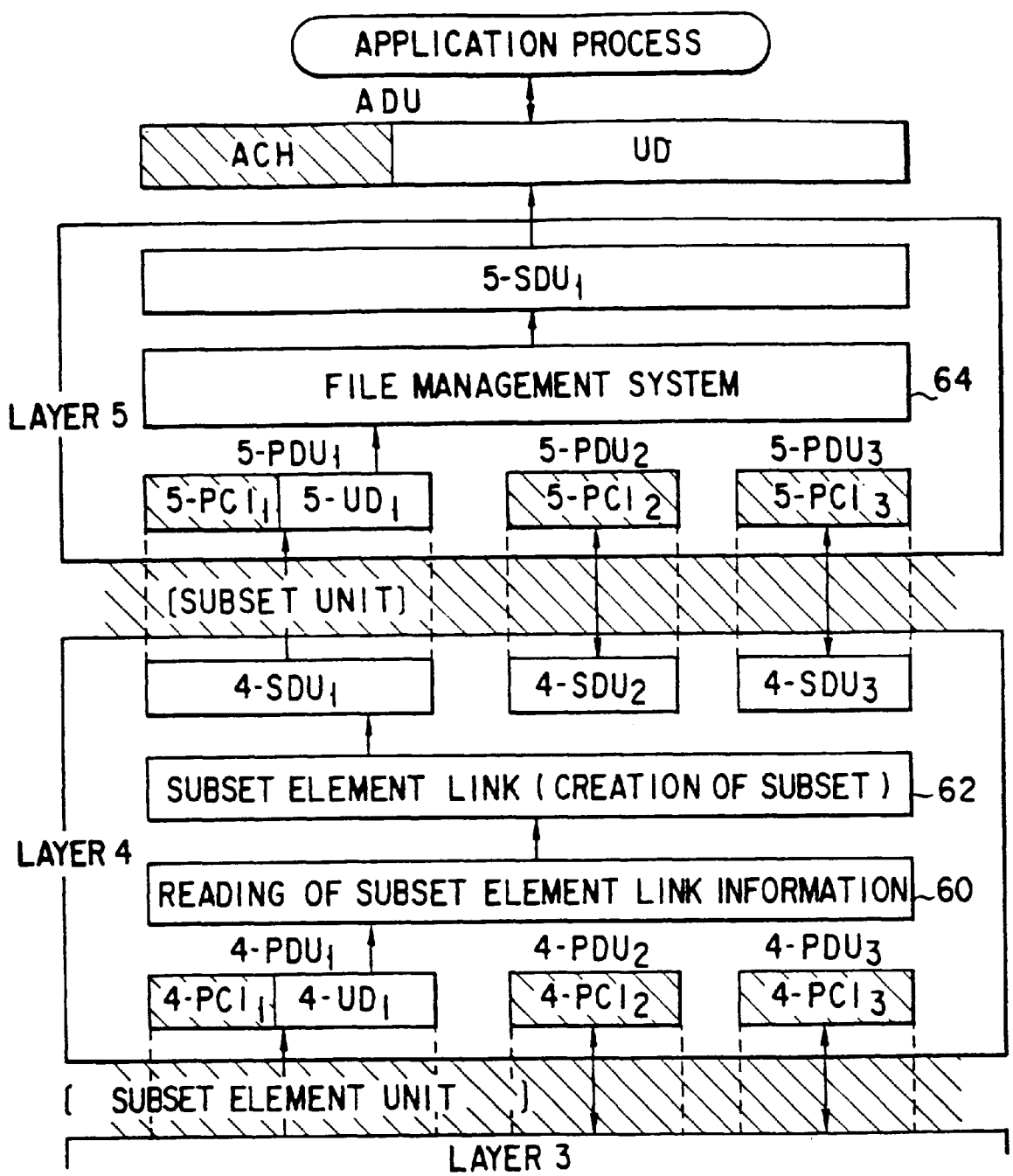

FIG. 3A and FIG. 3B are diagrams showing an example of the procedure of a process effected over multiple stages by use of a plurality of hierarchical structures on the reproducing side. In the drawing, N-SDU$_n$ indicates the Nth layer service data unit No. n, N-PDU$_n$ indicates the Nth layer protocol data unit No. n, N-PCI$_n$ indicates the Nth layer protocol control information No. n (corresponding to various processing information in this invention), N-UD$_n$ indicates the Nth layer user data No. n, ADU indicates the application data unit, and ACH indicates the application control header (n=1 indicates data, n=2 indicates status information, and n=3 indicates control information).

First, the layer 1 (physical layer) plays a basic role of ensuring reliably transmission of quantization data of a dot image. The layer 1 defines electrical/physical conditions and various conditions for quantization (that is, simple transfer rule of the dot pattern, equalization system, quantization system and the like). The intra-layer function required for the layer 1, that is, the service provided therefor includes provision of a plurality of transmission media (paper types), permission of plural dot density, provision of a plurality of scanner resolutions, provision of a plurality of transmission means for video signals, and provision of reading starting/ending function, and it may further include representation of a plurality of gradations (binary value, multiple values) of dots, and permission of multiplexed representation of dots (color image photographing, transmission) as required.

The layer 1, that is, the physical layer has a functional module (photographing-system module 32) of optically photographing or picking up a dot code pattern recorded on the information recording medium (transmission medium) 30 such as paper and outputting an image signal, and a functional module (reproduction equalizing module 34, quantization module 36) of subjecting an image signal to the pre-processing (gain control, equalization processing) and then sampling/quantizing the signal. Further, it has a functional module of converting the quantized value into digital data to create image data, a functional module of forming image data into a structure form to convert the data into a given data format constructed by structure information (header, that is, first processing information) and data (substance of image data) and outputting the same to an adjacent upper layer, that is, the layer 2, a functional module of inputting/outputting status information and control information relating to the process and the like.

Structured (image) data of photographing frame unit is given from the layer 1 to the upper layer 2 as a service data unit (1-SDU$_1$).

The layer 2 (block data layer) plays a basic role of reliably transmitting a block and a bit string in the block (in-block bit string). The layer 2 defines various conditions (that is, block detection system, channel bit detection system, coding modulation/demodulation system, and the like) for block transmission. The intra-layer function required for the layer 2, that is, the service provided therefor includes block extraction and detection of dot sampling points, provision of a plurality of recording systems (provision of binary value, multiple values, multiplexed system and the like), provision of a plurality of block patterns, provision of a plurality of coding modulation/demodulation systems, detection of the relative position of the block, information of block detection error, obstruction overcoming operations and the like. In this case, provision of a plurality of block patterns includes a block size detection function, marker definition/detection function, adaptation of the readout order of various dots and the like.

The layer 2, that is, the block data layer includes a functional module of receiving structured (image) data (1-SDU$_1$) input from the adjacent lower layer, that is, the layer 1 as 2-PDU$_1$, recognizing and dividing the structure information (2-PDI$_1$, that is, first processing information) and data substance (2-UD$_1$), and converting the data substance into a suitable form for the process, a functional module (block-unit dot detection point extraction (marker detection, pattern matching and the like) module 38, dot detection (identification/determination module 40) of processing the data substance converted into the suitable form for the processing and extracting a plurality of blocks formed in a block form for every given information code unit, and a functional module (block ID data reproducing module 42, in-block data reproducing module 44) of processing the extracted block and reproducing the information code of block unit. In this case, the information code of block unit contains data substance, coding modulation information and structured information for linking a plurality of blocks. Further, the layer 2 has a functional module (coding demodulation module 46) of reading the coding modulation information from the information of block unit and demodulating the data substance according to the coding modulation information, a functional module of outputting structured data (block header, that is, second processing information) of the demodulated block-form information code and data substance (user data) to the adjacent upper layer, that is, the layer 3 as 2-SDU$_1$, a functional module of inputting/outputting control information and status information relating to the processing, and the like.

That is, in the layer 2, a block unit dot detection point or marker is detected from image data for every block data which is the first given unit, and data dots are detected for every block unit according to the detected marker to restore data of bit string. The detail of the processing is described in International Application No. PCT/JP93/01377 (International Application KOKAI Publication No. WO 94/08314). For data of the block unit, a header or block ID data is reproduced, then in-block data is reproduced as user data, demodulation for coding is effected and the data is given to the upper layer, that is, the layer 3 as data of block data unit.

The layer 3 (data link layer) plays a basic role of creating a given data mass (subset element (fourth given unit)) which is ensured to have a preset error quality and ensuring reliably transmission. The layer 3 defines conditions for linking block data (first given unit) and various conditions (that is, interleave system/structure) for creating macro-blocks (third given unit)/supermacro-blocks (second given unit), (super) macro-block header and user data error control (that is, ECC system/structure) and the like. The intra-layer function required for the layer 3, that is, the service provided therefor includes provision of a function of restoring an abnormal condition of block address reading/writing, determination of a reading state of a desired block (checking of a block of valid reading), setting of block arrangement structure, creation of intermediate data masses, provision of a plurality of interleave systems/ranges/structures, provision of a plurality of ECC systems/ranges/structures, and the like.

The layer 3, that is, the data link layer has a functional module (block link (macro-block creation) module 48) of receiving a block-formation information code (2-$SDU_1$) input from the adjacent lower layer, that is, the layer 2 as 3-$PDU_1$, recognizing and reading structured information (3-$PCI_1$, that is, second processing information) from the input code, and linking a plurality of data substances (3-$UD_1$) of block unit according to the structured information to create (construct) a macro-block or supermacro-block. That is, it receives bit data strings in the block unit from the layer 2, recognizes and divides a block header as 3-$PCI_1$, (second processing information) of a given number of bits from the head of each block and a user data as 3-$UD_1$, and linking blocks according to information described in the block header to create a macro-block. The thus created macro-block is constructed by attached information (macro-block header, that is, one of second processing information) dispersedly arranged in the block and data substance (user data).

Further, the layer 3 has an error correction functional module (macro-block header unit de-interleave/error correction module 50) of correcting the macro-block header according to a predetermined error correction process after the macro-block is re-arranged according to predetermined de-interleave, a functional block (macro-block link (supermacro-block creation) module 52) of reading structured information for creating (constructing) a supermacro-block from the macro-block header, and linking a plurality of macro-blocks according to the structured information to create (construct) a supermacro-block, a functional module (supermacro-block unit de-interleave module 54) of reading interleave information from the macro-block header and de-interleaving user data of the supermacro-block according to the interleave information, a functional module (supermacro-block unit error correction module 56) of reading error correction information from the macro-block header and correcting the error of the user data subjected to the de-interleaving process according to the error correction information, a functional module (subset element unit output processing module 58) of reading structure specifying information of a subset element, that is, subset element header from the macro-block header and separating the subset element from the user data of the supermacro-block after the error correction according to the subset element header, a functional module of outputting the separated subset element unit to the adjacent upper layer, that is, the layer 4 as 3-$SDU_1$, and a functional module of inputting/outputting status information and control information relating to the process.

That is, the layer 3 has a multi-stage function of first linking or coupling the blocks to create a macro-block and then linking the macro-block to a supermacro-block. Then, after the error correction process, it reads the subset structure specification (third processing information) described in the macro-block header, separates the supermacro-block into data corresponding to the concept of subset elements, and outputs the subset elements. That is, data is given to the upper layer as 3-$SDU_1$ in the unit of subset element.

The layer 4 (presentation layer) plays a basic role of ensuring creation of a subset. The layer 4 defines various conditions for linking subset elements to create a subset. The intra-layer function required for the layer 4, that is, the service provided therefor includes selection of subset elements necessary for an object file, creation of the subset and determination of the condition therefor, and adaptable data conversion for DOS or the like. The subset indicates recognizable information unit data. That is, the macro-block and supermacro-block contain multimedia information such as sound and picture and each of data masses obtained by dividing the above block into data masses each of which is limited to information relating only to sound or information relating only to picture so as to be recognized as one type of information unit is called a subset.

The layer 4, that is, the presentation layer has a functional module (subset element link information reading module 60) of receiving data (3-$SDU_1$) of subset element unit input from the adjacent lower layer, that is, the layer 3 as 4-$PDU_1$ and reading structured information (4-$PCI_1$, that is, fourth processing information) from the received data, and a functional module (subset element link (subset creation) module 62) of linking data substances of subset element unit according to the read structured information to create (construct) a subset. Data of subset element unit is constructed by structured information (subset element header) for linking subset elements to create (construct) a subset and user data substance.

Further, the layer 4 has a functional module of reading attached information necessary for an existing or new interface with the adjacent upper layer from the created subset and attaining the interface matching, a functional module of outputting part of the subset or the entire attached information and data substance as 4-$SDU_1$ to the adjacent upper layer, that is, the layer 5, and a functional module of inputting/outputting control information and status information relating to the process.

The layer 5 (application layer) plays a basic role of unfailingly ensuring that the file management can be carried out in good condition. The layer 5 defines various conditions (that is, file creating condition and the like) for effecting the file management. The intra-layer function required for the layer 5, that is, the service provided therefor includes provision of the read/write process of a subset or file of application request.

The layer 5, that is, the application layer has a functional module (file management system module 64) of receiving subset data (4-$SDU_1$) input from the adjacent lower layer, that is, the layer 4 as 5-$PDU_1$, reading file management information from the attached information (5-$PCI_1$, that is, fifth processing information) or data substance (5-$UD_1$), effecting the file management according to the file management information, and reading data in the unit of subset or in the unit of file after linking subsets to create a file, a functional module of outputting data unit of the file unit or subset unit created based on the file management as 5-$SDU_1$ to the application process, and a functional module of inputting/outputting control information and status information relating to the process.

The application process plays a basic role of realizing the application using the MMP system. The application process includes the source sample data shuffling system/structure, scramble system/structure for ciphering, and data compression system/structure, data structure of sound, text or image and the like. The function required for the application process, that is, the service provided therefor includes provision of source sample data shuffling system, provision of scramble system and the like, and it may further include provision of a plurality of data compression systems and compression/expansion operations, determination of information types, selection of data structure and the like, if required.

Now, one embodiment of this invention is explained with reference to the accompanying drawings. This invention relates to the detail of the layer 3 (data link layer), the layer 4 (presentation layer), and the layer 5 (application layer) for realizing the hierarchical structure described in Jpn. Pat. Appln. No. 6-121368 (International Application No. PCT/JP95/01050).

Figure 4:
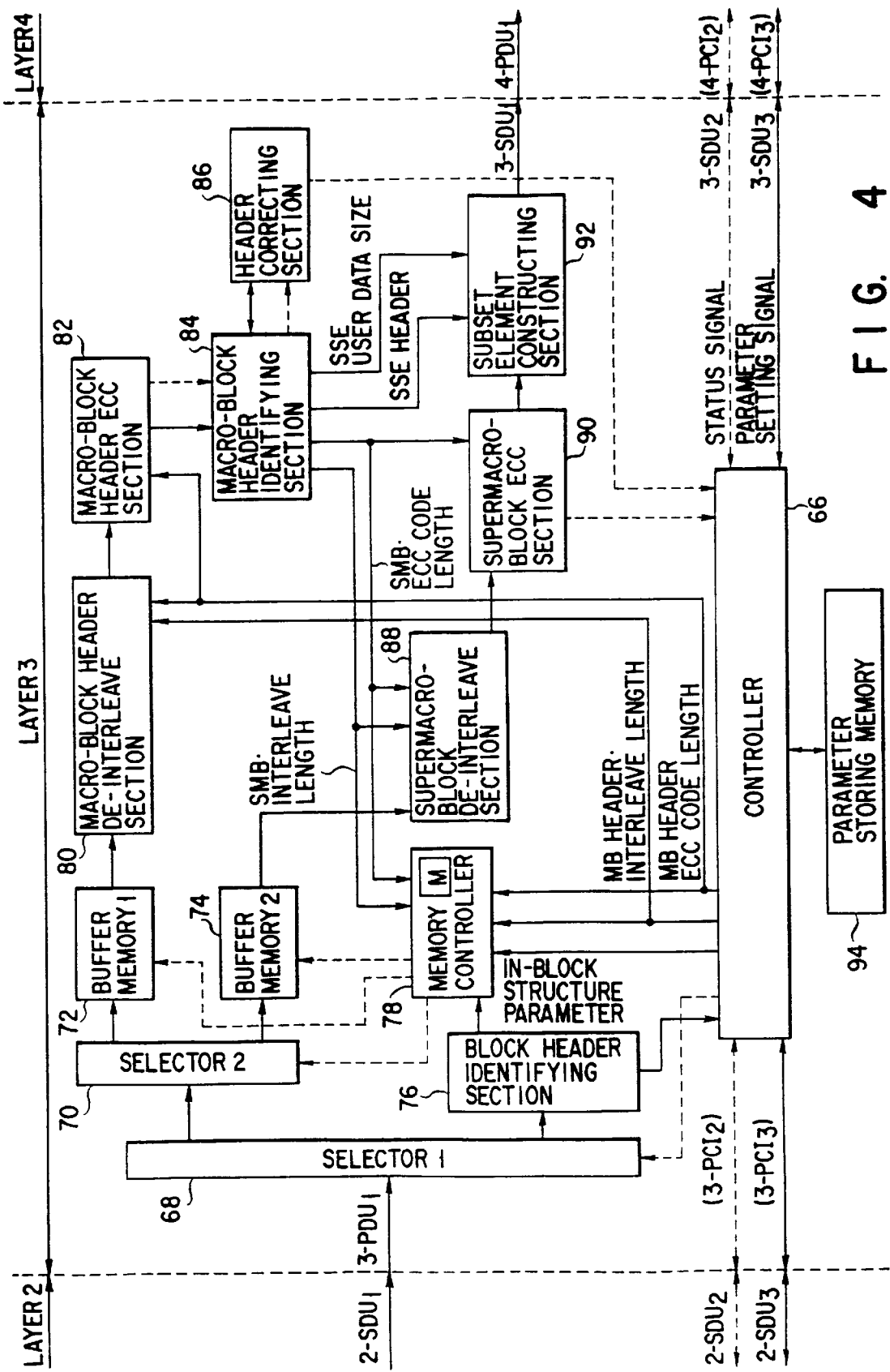
FIG. 4 is a block construction diagram of the layer 3 in one embodiment.

FIG. 4 is a diagram showing the structure of the layer 3.

In the layer 3, the second layer service unit No. 1 (2-SDU$_1$) from the layer 2 is received as the third layer protocol data unit No. 1 (3-PDU$_1$). Further, it receives 2-SDU$_2$ which is a status signal as 3-PCI$_2$, receives 2-SDU$_3$ which is a parameter setting signal as 3-PCI$_3$, and outputs 3-PCI$_2$ and 3-PCI$_3$ respectively as 2-SDU$_2$ and 2-SDU$_3$ to the layer 2.

The status signal from the layer 2 to the layer 3 includes a signal indicating the error state detected in the layer 2, a signal indicating the scanning state which the layer 2 has received from the layer 1, a signal indicating the output state of the service data unit from the layer 2, that is, start and stop signal of the layer 3 and the like. The status signal from the layer 3 to the layer 2 includes a received state signal determining whether or not the service data unit is received by the layer 3 and the like. The parameter setting signal includes a signal for reading out the content of the parameter memory (not shown) of the layer 2 by means of the layer 3, a signal for setting data into the parameter memory of the layer 2 and the like.

The layer 3 includes a controller 66, first and second selectors 68 and 70, first buffer memory 72, block header identifying section 76, memory controller 78, macro-block header de-interleave section 80, macro-block header ECC section 82, macro-block header identifying section 84, header correcting section 86, supermacro-block de-interleave section 88, supermacro-block ECC section 90, subset element constructing section 92, and parameter storing memory 94. The controller 66, first and second selectors 68 and 70, second buffer memory 74, block header identifying section 76 and memory controller 78 correspond to the block link module 48, and the controller 66, first buffer memory 72, macro-block header de-interleave section 80, macro-block header ECC section 82, macro-block header identifying section 84 and header correcting section 86 correspond to the macro-block header unit de-interleave/error correction module 50. Further, the second selector 70, second buffer memory 74 and memory controller 78 correspond to the macro-block link module 52, and the supermacro-block de-interleave section 88 corresponds to the supermacro-block unit de-interleave module 54. The supermacro-block ECC section 90 corresponds to the error correction module 56 of the supermacro-block, and the subset element constructing section 92 corresponds to the subset element unit output processing module 58.

The controller 66 receives status signals and parameter setting signals from the layer 2 and layer 4, reading out parameters from the parameter storing memory 94 according to the received signals to control the whole portion of the layer 3 and output status signals and parameter setting signals to the layer 2 and layer 4. Further, among the parameters read out from the parameter storing memory 94, the in-block structure parameter is set into the memory controller 78, the macro-block (MB) header interleave length is set into the memory controller 78 and macro-block header de-interleave section 80, and the MB header error correction (ECC) code length is set into the memory controller 78, macro-block header de-interleave section 80 and macro-block header ECC section 82.

The first selector 68 selectively supplies block user data and block header information among the data of 3-PDU$_1$ to the second selector 70 and block header identifying section 76, respectively, under the control of the controller 66.

The block header identifying section 76 identifies information of the block header and outputs the result identification to the memory controller 78.

The memory controller 78 controls the second selector 70, first and second buffer memories 72 and 74 according to the parameters from the controller 66, the result of identification from the block header identifying section 76 and parameters (supermacro-block (SMB) interleave length and SMB ECC code length) set by the macro-block header identifying section 84.

The second selector 70 selectively supplies only the first several bytes, that is, data of interleaved macro-block header among the block user data from the first selector 68 to the first memory 72 and supplies the remaining bytes to the second buffer memory 74 under the control of the memory controller 78.

The first buffer memory 72 stores header information of the macro-block by the write control of the memory controller 78 and supplies data read out by the readout control thereof to the macro-block header de-interleave section 80.

The second buffer memory 74 stores block user data other than data stored into the first buffer memory 72 by the write control of the memory controller 78 and supplies data read out by the readout control thereof to the supermacro-block de-interleave section 88.

The macro-block header de-interleave section 80 de-interleaves macro-block header information read out from the first buffer memory 72 by using the parameters set by the controller 66 and supplies the result to the macro-block header ECC section 82.

The macro-block header ECC section 82 performs the error correction of the de-interleaved macro-block header information by using the parameter set by the controller 66 and supplies the result to the macro-block header identifying section 84. Further, it supplies a correction state signal indicating whether the error correction can be effected or not to the macro-block header identifying section 84.

The macro-block header identifying section 84 determines whether the error correction can be effected or not based on the correction state signal, and if the error correction has been effected, it identifies the macro-block header information after the error correction and sets the parameters obtained as the result of identification into the memory controller 78, supermacro-block de-interleave section 88, supermacro-block ECC section 90, and subset element constructing section 92. That is, it sets the SMB interleave length and SMB ECC code length into the memory controller 78 and supermacro-block de-interleave section 88, sets the SMB ECC code length into the supermacro-block ECC section 90, and sets the subset element (SSE) header and SSE user data size into the subset element constructing section 92. Further, if the error correction could not be effected, it supplies information of the adjacent stored macro-block headers to the header correcting section 86. The macro-block header identifying section 84 has a buffer memory (not shown) for storing a plurality of macro-block headers and replaces oldest macro-block header by a new macro-block header.

The header correcting section 86 corrects the content of information of the macro-block header, which cannot be effected the error correction, according to information of the adjacent macro-block headers, and if the data content is corrected, it returns the corrected information of macro-block header to the macro-block header identifying section 84. Further, if the data content is not corrected, it outputs a correction error signal indicated by the broken lines in the drawing to the controller 66, and then, the controller 66 sends the signal which the macro-block header could not read to the layer 4 and upper layers as a status signal (3-SDU$_2$) according to the correction error signal.

The supermacro-block de-interleave section 88 de-interleaves data read out from the second buffer memory 74 by the readout control of the memory controller 78 according to the parameters set by the macro-block header identifying section 84 to construct a supermacro-block and supplies the supermacro-block to the supermacro-block ECC section 90.

The supermacro-block ECC section 90 performs the error correction of the supermacro-block according to the parameter set by the macro-block header identifying section 84 and supplies the result of correction to the subset element constructing section 92. Further, if the error correction cannot be effected, it outputs a correction error signal indicated by the broken lines in the drawing to the controller 66, and then, the controller 66 sends the signal which the supermacro-block could not read to the layer 4 and upper layers as a status signal (3-SDU$_2$) according to the correction error signal.

The subset element constructing section 92 constructs a subset element based on data of supermacro-block whose error is corrected by using the parameters set by the macro-block header identifying section 84 and sends the same to the upper layer 4 as 3-SDU$_1$ in the unit of subset element.

As shown in FIG. 5A, block data (3-PDU$_1$) sent from the layer 2 is constructed by a set specification identifying code 96, user data format type 98, block address 100, block user data size (in-block data number) 102, and block user data 104, and the set specification identifying code 96, user data format type 98, block address 100, and block user data size 102 among the above data items are supplied to the block header identifying section 76 via the first selector 68.

As is described in detail in Jpn. Pat. Appln. No. 6-173966 by the inventors of this invention, the set specification identifying code 96 is a code representing the parameters of dot size, block size and the like. That is, the parameters necessary for the process of decoding the content of data of the dot code effected in the upper layer are derived from a given memory (for example, parameter storing memory 94) by referring to the code. For example, if the set specification identifying code 96 is "00", a certain parameter is set in the layer 1, a parameter necessary for the layer 2 is set in the layer 2, a parameter necessary for the layer 3 is set in the layer 3, a parameter necessary for the layer 4 is set in the layer 4, a parameter necessary for the layer 5 is set in the layer 5, and in this way, the same code "00" is transmitted to the layer 1, layer 2, ---, layer 5, but parameters input to the respective layers are different from layer to layer. As is described in Jpn. Pat. Appln. No. 6-173966, the set specification identifying code 96 is set by reading a system control file (SCF) recorded on the information recording (transmission) medium 30 such as paper on which the dot code 10 is recorded.

The set specification identifying code is sent from the block header identifying section 76 to the controller 66 and is used to derive a parameter necessary for the layer 3 from the parameter storing memory 94.

The user data format type 98 represents items of parameters described below the user data format type. That is, by describing the user data format type 98, it becomes possible to omit all of the contents of the parameters. For example, if the user data format type 98 is set to a code "01", the block address 100 and block user data size 102 are attached to the user data and sent, and if the user data format type 98 is set to a code "02", the block address 100, block user data size 102 and other data are attached to the user data and sent, and the type and array of information of 3-PCI$_1$ are selected and recognized in the layer 3.

Thus, by attaching the block address 100 and block user data size 102, even if information of code with different block data size is transferred from the layer 2, the layer 3 can recognize a difference in the information by recognizing the information and can process the information.

FIG. 5B is a diagram showing the block data structure in a case where the user data format type 98 is set to a code "02", for example. In this case, the block header contains a block address error status flag (NO/YES of block address compensation) 106 in addition to the set specification identifying code 96, user data format type 98, block address 100, and block user data size 102.

FIG. 5C is a diagram showing the block data structure in a case where the user data format type 98 is set to a code "03", for example. In this case, the block header contains a block user data demodulation error number 108 in addition to the set specification identifying code 96, user data format type 98, block address 100, block user data size 102 and block address error status flag 106.

FIG. 5D is a diagram showing the block data structure in a case where the user data format type 98 is set to a code "04", for example. In this case, the block header contains a block user data demodulation error position 110 in addition to the set specification identifying code 96, user data format type 98, block address 100, block user data size 102 and block address error status flag 106.

The block address error status flag 106 indicates four states shown in FIG. 6. That is, when an error correction of the block address is performed in the layer 2, the flag takes a value of "1" if no error is present in the block address, it takes a value of "2" if the block address is made valid by the error correction, it takes a value of "3" if miscorrection or decoding failure is occurred but correction by use of the adjacent blocks can be attained later, and it takes a value of "4" if miscorrection or decoding failure is occurred and the correction by use of the adjacent blocks cannot be attained.

The memory controller 78 determines the priority based on the value of the block address error status flag 106 when the same block is sent by plural times and thus it can control the data writing (overwriting) into the first and second buffer memories 72 and 74. That is, it previously stores the block address error state flag of each block in a built-in memory M, compares the block address error status flag of a corresponding block sent with the stored flag, gives priority to a block having a smaller flag value, and replaces the block.

Figure 7:
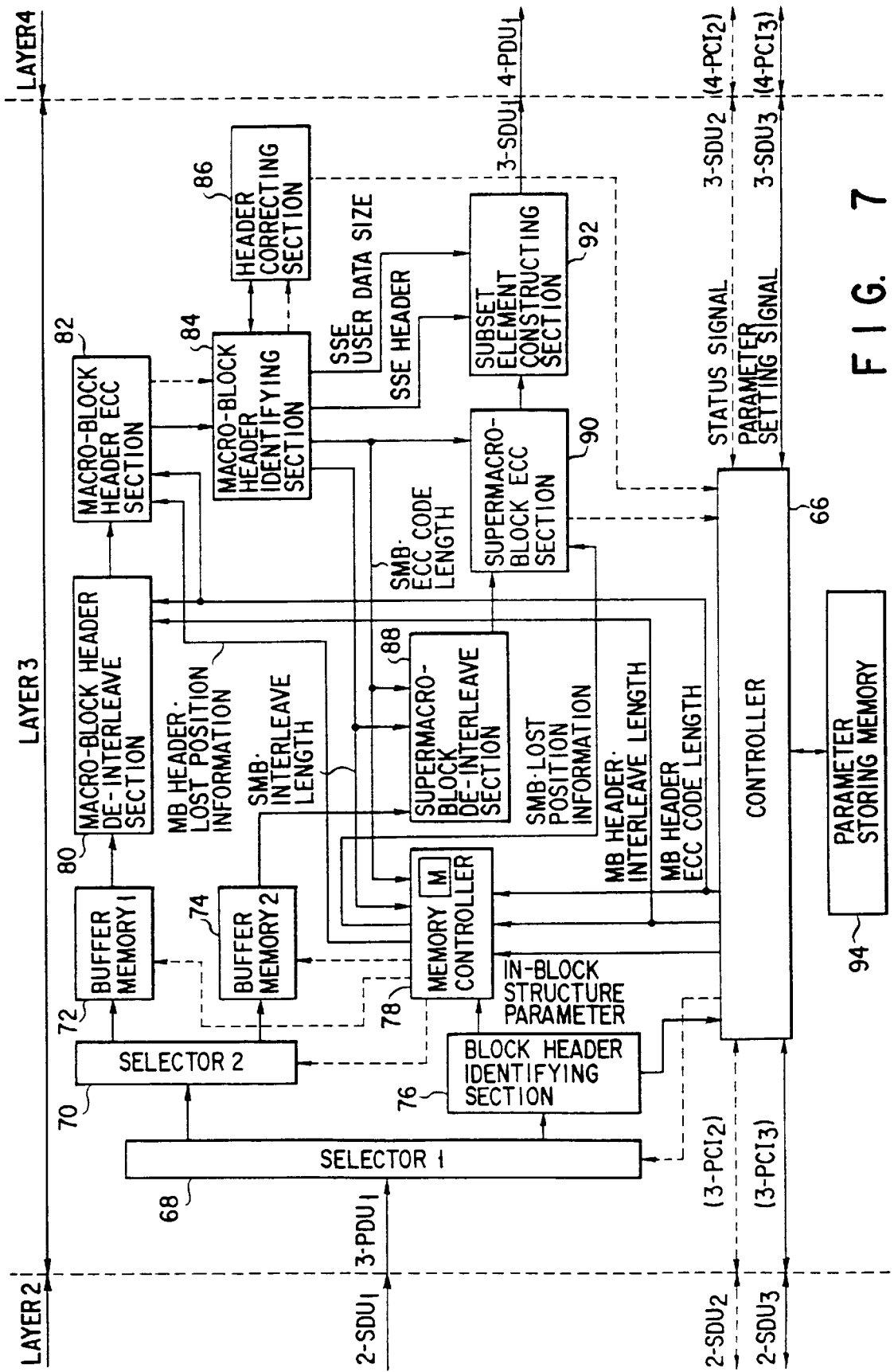
FIG. 7 is a block construction diagram showing a modification of the layer 3.

Further, as shown in FIG. 7, the memory controller 78 can create MB header lost position information and SMB lost position information according to the block address error status flag 106 and supply the information to the macro-block header ECC section 82 and supermacro-block ECC section 90. That is, if the block address error status flag 106 is "4", that is, if the address of data of the block cannot be read, all of the data of the block will be lost. Therefore, the position of the lost block is determined by the memory controller 78 by use of the block address 100 of the block, the lost position in the header of the macro-block and the lost position of the supermacro-block are determined and supplied to the macro-block header ECC section 82 and supermacro-block ECC section 90 as the MB header lost position information and SMB lost position information.

The error correction requires two information items of error position information and error pattern information for correcting the error in the position, and the former information of the two information items can be supplied to the ECC sections 82, 90 as lost position information. Since an error correction check digit supplied to a corresponding one of the ECC sections as part of the macro-block header or supermacro-block can be used only for the latter information as will be described latter, information of an error pattern can be substantially twice the error pattern obtained in a case where the two information items are represented by use of the same amount of information, and as a result, the error correcting ability in the ECC sections 82, 90 can be substantially doubled when all of the error positions are detected.

Further, as information for creating the lost information, the block user data demodulation error position 110 can be used. That is, since the position in the block in which the demodulation error has occurred can be detected, the memory controller 78 can easily derive information indicating the position in the macro-block header in which the loss or disappearance has occurred or the position in the supermacro-block in which the loss has occurred.

The reason why the block user data demodulation error number 108 is provided is that if the block user data demodulation error number 108 is sent from the layer 2 when data of the same block which is repetitively transferred is obtained, that is, when the block of the same address is transferred by plural times in a case where the blocks are linked in the layer 3, the memory controller 78 can reduce the error rate of data prior to the error correction, correct the error at high speed and reduce the frequency at which the error correction cannot be effected by comparing the demodulation error number stored in the built-in memory M and obtained by the time prior to the preceding cycle with the present demodulation error number, selecting block data having a less number of errors and re-constructing the data by use of the selected block data.

Of course, the block user data demodulation error position 110 is also stored in the built-in memory M of the memory controller 78, and when block data of the same address is repetitively input and if the error states of the block address are the same, the frequency of occurrence of errors in the block data can be reduced by adequately selecting a preset unit in the block data, that is, demodulation data unit according to the block user data demodulation error position.

Next, the structure of a macro-block header obtained as the result of the de-interleave process by the macro-block header de-interleave section 80 is explained.

As shown in FIG. 8A, the macro-block header includes a set specification identifying code 112, user data format type 114, macro-block link information 116 for linking macro-blocks, SMB interleave system information 118 relating to a system for interleaving the supermacro-block, SMB error correction system information 120 relating to a system for correcting the error of the supermacro-block, SMB error detection system information 122 relating to a system for detecting the error of the supermacro-block, subset element link information 124 for linking subsets, subset element user data size 126, error detection check digit 128, and error correction check digit 130.

The error detection check digit 128 is used to check whether or not an error occurs in linearly arranged data constructed by linearly arranging the above data items ranging from the set specification identifying code 112 to the subset element user data size 126. The error detection by the error detection check digit 128 is effected in the macro-block header ECC section 82 together with the error correction by the error correction check digit 130.

In practice, as shown in FIG. 8B, the macro-block header has a two-dimensional structure. As indicated by the MB error correction code length in FIG. 8B, the error correction check digit is provided for data of a certain column and the error correction is effected in the vertical direction in FIG. 8B. By interleaving with the two-dimensional structure, it becomes resistant to burst error.

Further, as shown in FIG. 8C, it is possible to additionally provide a lateral error correction check digit 132. Alternatively, it is possible to effect the error correction in an oblique direction.

FIG. 9A to FIG. 9C are diagrams showing an example of the more concrete structure of FIG. 8A to 8C.

That is, the SMB interleave system information 118, SMB error correction system information 120, and SMB error detection system information 122 are respectively replaced by SMB interleave length 118', SMB error correction code length 120', and SMB error detection/non-detection determination flag 122'.

Next, the structure of a supermacro-block obtained as the result of the de-interleave process by the supermacro-block de-interleave section 88 is explained.

The structure of the supermacro-block, for example, the type of error correction or the type of interleaving process to which it is subjected, or the value of the error correction code length which it will have, is determined according to information in the macro-block header, that is, the set specification identifying code 112, or user data format type 114 and succeeding information.

Figure 10A:
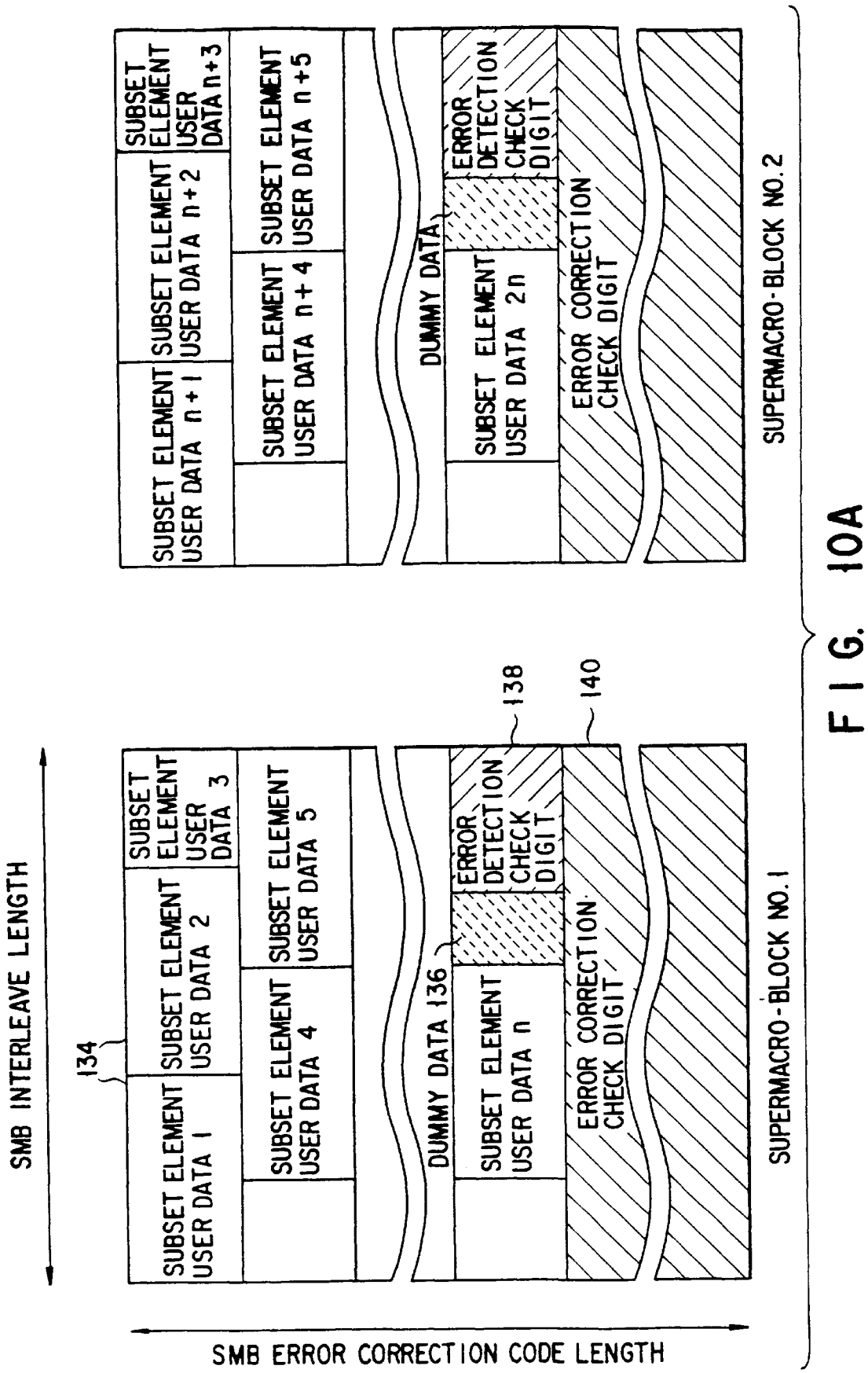
FIG. 10A is a diagram showing an example of the structure of a supermacro-block and FIG. 10B is a diagram showing another example of the structure of a supermacro-block.
Figure 10B:
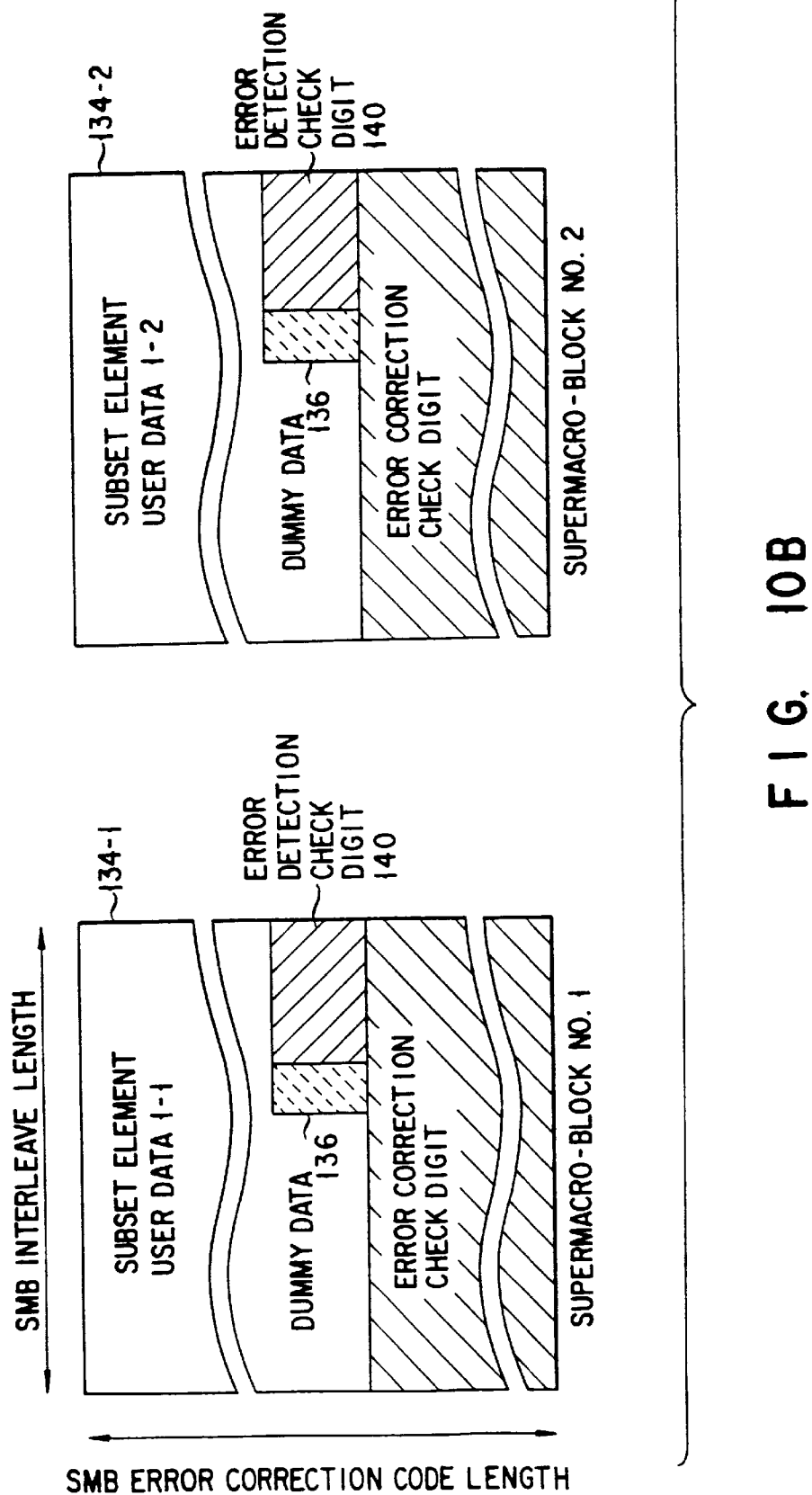

FIG. 10A and FIG. 10B are diagrams showing the structure of the supermacro-block, and as shown in FIG. 10A and FIG. 10B, the size of the supermacro-block is variable and the size of the subset element is also variable.

That is, FIG. 10A shows a case wherein a plurality of subset element data items 134 are present in one supermacro-block. Dummy data 136 and error detection check digit 138 are successively inserted in this order in the remaining portion. The error detection check digit 138 is used for checking whether an error occurs in linearly arranged data obtained by linearly arranging the subset element user data items 1 to n and dummy data in the supermacro-block No. 1, for example. After the error detection check digit 138, an error correction check digit 140 is attached in the vertical direction. Therefore, at the time of decoding, the supermacro-block ECC section 90 first recognizes the error correction check digit 140, effects the decoding of error correction to effect the error correction and attain the original data, and then checks whether or not an error is present in the data by using the error detection check digit 138 obtained by linearly and sequentially observing the data.

Like the supermacro-block No. 1, the supermacro-block No. 2 has a structure in which n subset element data items 134 sequentially arranged starting from the subset element user data item (n+1) if n subset element data items 134 are arranged in the supermacro-block No. 1.

FIG. 10B shows a case wherein two supermacro-blocks are provided to construct one subset element 134 (the supermacro-blocks respectively contain halves 134-1 and 134-2 of the subset element). Further, FIG. 10B shows a case wherein the size of the supermacro-block is smaller than that of the example shown in FIG. 10A.

Of course, it is possible to construct one subset element user data by one supermacro-block.

Figure 11B:
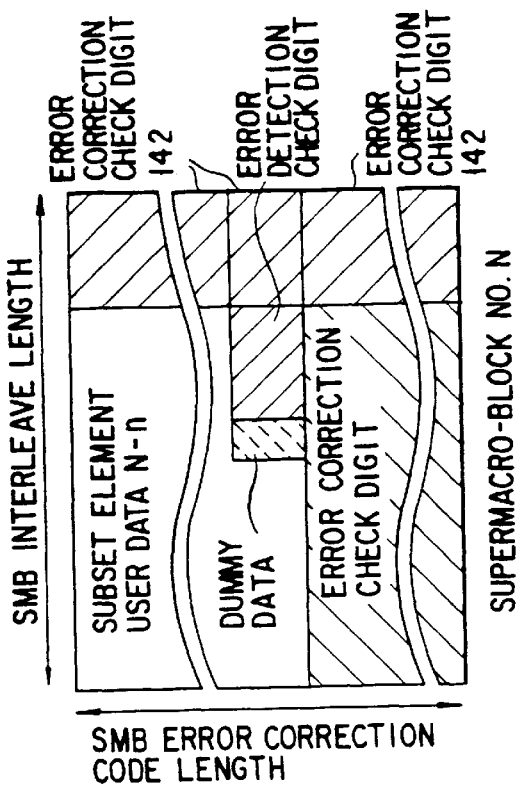
FIGS. 11A and 11B are diagrams showing modifications of the supermacro-blocks of FIGS. 10A and 10B.
Figure 11A:
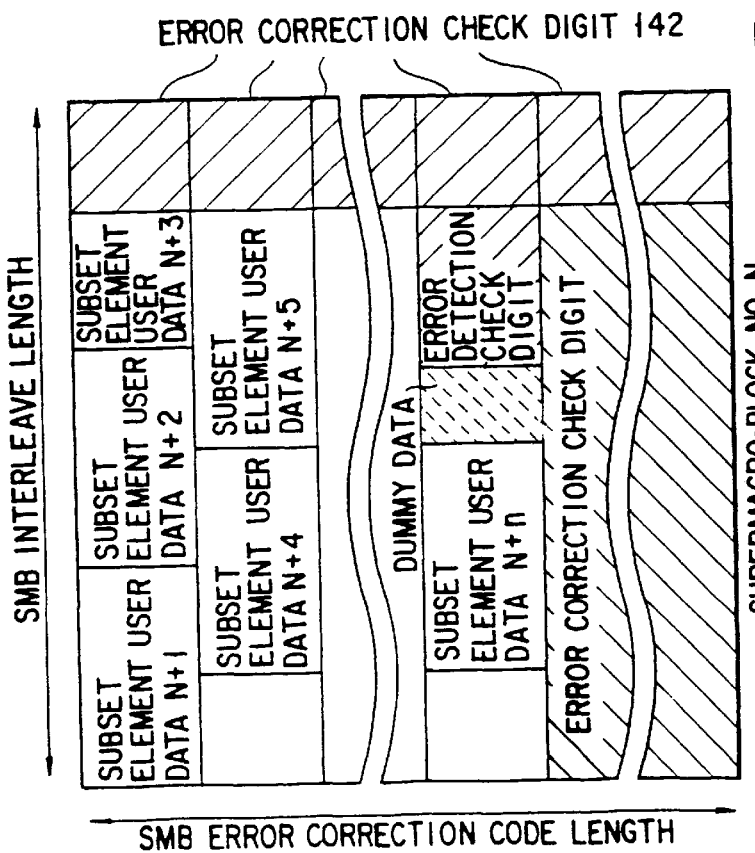

Further, as shown in FIG. 11A and FIG. 11B, like the case of the macro-block header, lateral error correction check digits 142 can be additionally provided in the supermacro-block. Alternatively, the error correction can be effected in an oblique direction.

Next, the structure of the subset element constructed by the subset element constructing section 92 of FIG. 4 is explained.

Figure 12:
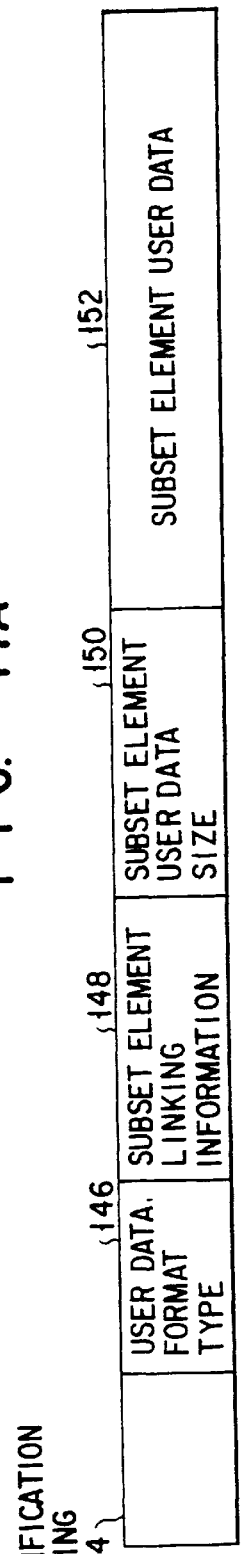
FIG. 12 is a diagram showing an example of the structure of a subset element.

As shown in FIG. 12, for example, the subset element has a structure including a set specification identifying code 144, user data format type 146, subset element linking information 148, subset element user data size 150 and subset element user data 152 successively arranged in this order. The subset element is sent to the layer 4 as 3-SDU$_1$. Of course, this is only an example and can be adequately modified according to information which the upper layer requires.

Further, 3-SDU$_2$ (which is 4-PCI$_2$ when viewed from the layer 4 side) which is a status signal and 3-SDU$_3$ (which is 4-PCI$_3$ when viewed from the layer 4 side) which is a parameter setting signal are transferred between the layer 3 (controller 66) and the layer 4. In this case, the status signal includes a signal indicating a state in which correction cannot be attained in the header correcting section 86 or a state in which error correction cannot be effected in the supermacro-block ECC section 90, a state signal indicating that a subset element as the service data unit created in the layer 3 is transmitted and the like. In the opposite direction, the status signal includes a reception state signal for determining whether or not the subset element is received by the layer 4 and the like. Further, the parameter setting signal is a signal for setting data from the upper layer into the parameter storing memory 94 and reading out the content of the parameter storing memory 94 in the upper layer.

Figure 13A:
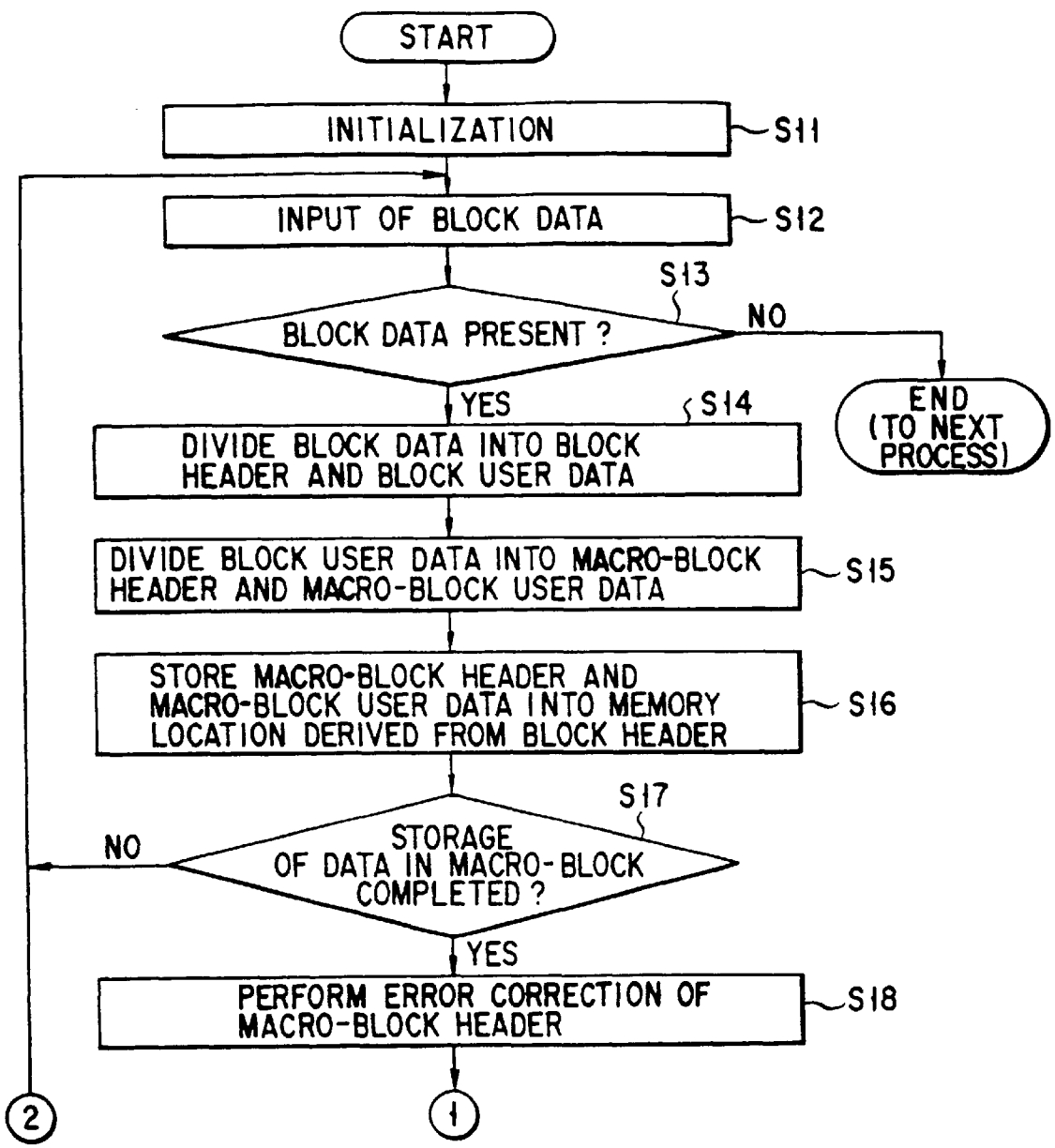

Next, the operation of the layer 3 with the above structure is explained with reference to the sequential flowcharts of FIGS. 13A and 13B.

First, in order to start the operation of the layer 3 from the layer 2, the parameter setting signal and set specification identifying code 96 are respectively derived from 2-SDU$_3$ (or 3-PCI$_3$) and 2-SDU$_1$ (or 3-PDU$_1$) to set the initial condition of the layer 3 (step S11) when a start signal is input as 2-SDU$_2$ (or 3-PCI$_2$). That is, according to the parameter setting signal and set specification identifying code 96, various parameters relating to the number of data items of the macro-block headers distributed in the respective blocks, the way of linking the macro-block headers, the method of error correction of the macro-block header, and the like are read out from the parameter storing memory 94 and stored into the controller.

Then, the layer 3 receives data (block data) of 3-PDU$_1$ from the layer 2 (step S12), and if block data is present (step S13), the first selector 68 divides the input block data into a block header and block user data 104, and the block user data 104 is supplied to the second selector 70 and the block header is supplied to the block header identifying section 76 (step S14).

For example, the block header identifying section 76 recognizes the block address 100, block user data size 102 and the like and supplies the identified data to the memory controller 78.

The memory controller 78 receives parameters including the number (in-block structure parameter) of data items of the macro-block headers distributed in the respective blocks fetched into the controller 68 in the initialization process, MB header interleave length, and MB header ECC code length together with information from the block header identifying section 76. Then, by using the information from the block header identifying section 76 and the above three parameters, it controls the switching position of the second selector 79 and the storing state of the first and second buffer memories 72 and 74. In practice, only the first several bytes in the block user data 104 divided by the first selector 68, that is, only the interleaved macro-block header is supplied to the first buffer memory 72 and the remaining data, that is, macro-block user data is supplied to the second buffer memory 74 (step S15).

In this case, since the block address 100 and block user data size 102 are supplied to the memory controller 78 as identifying information from the block header identifying section 76, the memory controller 68 stores an output of the second selector 70 in positions of the first and second buffer memories 72 and 74 calculated by using the above information (step S16). Alternatively, after writing data into the buffer memories 72 and 74 once, it checks the block address error status flag 106, and if data supplied now is better than the preceding data, that is, if a state in which no error is present is obtained, it rewrites data in the position.

Then, the memory controller 78 determines whether data of the macro-block is constructed or not according to the block address supplied from the block header identifying section 76, that is, it determines whether or not data of the macro-block or header data and user data are stored in the buffer memories 72 and 74 (step S17). If storage of data of the macro-block is not yet completed, the process returns to the step S12 and the above operation is effected again.

When data of the macro-block header is thus stored in the first buffer memory 72, the data is sent to the macro-block header de-interleave section 80. The macro-block header de-interleave section 80 has parameters of the MB header interleave length and MB header ECC code length from the controller 66 stored therein, de-interleaves data supplied from the first buffer memory 72 according to the above parameters, and supplies data of the macro-block header obtained by de interleaving to the macro-block header ECC section 82.

The macro-block header ECC section 82 has the MB header ECC code length from the controller 66 stored therein as a parameter, and in the example of FIG. 7, it has the MB header lost position information from the memory controller 78 stored therein as a parameter, and performs the error correction in the macro-block header according to the above parameter (step S18). Then, it supplies data after error correction to the macro-block header identifying section 84 for identifying the macro-block header. Further, as shown by broken lines in FIG. 4 or FIG. 7, a correction status signal indicating whether the error correction could be successfully effected or not is also supplied to the macro-block header identifying section 84.

The macro-block header identifying section 84 first determines whether or not the error correction for the macro-block header is completely effected according to the error status signal (step S19). Then, if the error correction could not be successfully effected, whether an error is present in the preceding macro-block header, that is, the macro-block header previously processed is determined (step S20), and if the error is detected, the process returns to the step S12 and then the process for next block data is started after the error process is effected (step S21). In this case, if the error correction for the first macro-block header could not be successfully effected, the process is effected as if an error is present in a preceding block header, although the preceding macro-block header is not present in this case.

In a case where the error correction could not be successfully effected, but no error is present in the preceding macro-block header, the macro-block header identifying section 84 supplies data of the macro-block header whose error could not be corrected to the header correcting section 86 and corrects the macro-block header (step S22). That is, the header correcting section 86 corrects for the error in the data content of the macro-block header by use of information of the preceding macro-block header. Then, whether or not the macro-block header is corrected by the correction process is determined (step S23), and if it could not be corrected, the process proceeds to the error process of the step S21.

When the error occurs in the two macro-block headers, that is, when the result of determination in the step S20 is "NO", the corresponding portion cannot be corrected for by use of the adjacent macro-block header at this time so that the process of forcedly terminating the process may be effected as the error process of the step S21. Further, when the macro-block header could not be corrected by the header correcting section 86, that is, when the result of determination in the step S23 is "NO", a correction error signal indicated by broken lines in the FIG. 4 or FIG. 7 is output to the controller 66 and the controller 66 effects the error process of sending a signal indicating that the macro-block header could not be read as a status signal (3-SDU$_2$) to the layer 4 and the succeeding layers according to the correction error signal.

If the macro-block header could be corrected by the header correcting section 86, data of the corrected macro-block header is fed back to the macro-block header identifying section 84.

On the other hand, if the error of the macro-block header could be successfully corrected (step S19), the macro-block header identifying section 84 checks whether or not an error is present in the preceding macro-block header (step S24). If the error is present in the preceding macro-block header, the process proceeds to the step S22 and the header correcting section 86 uses the macro-block header whose error is corrected so as to correct the macro-block header which could not be corrected in the preceding cycle.

Thus, if the macro-block header can be corrected, or if it can be corrected and no error is present in the preceding macro-block header, the macro-block header identifying section 84 identifies information in the macro-block header to derive supermacro-block constructing parameters and subset element constructing parameters (step S25). Then, it sets the parameters into the memory controller 78, supermacro-block de-interleave section 88, supermacro-block ECC section 90, and subset element constructing section 92. That is, it sets the SMB interleave length and SMB ECC code length into the memory controller 78 and supermacro-block de-interleave section 88, sets the SMB ECC code length into the supermacro-block ECC section 90, and sets the SSE header and SSE user data size into the subset element constructing section 92.

If the SMB interleave length and SMB ECC code length are set into the memory controller 78, the size of the supermacro-block can be defined by the two parameters, and therefore, the memory controller 78 calculates the size, determines whether data of an amount corresponding to the data size is set in the second buffer memory 74, that is, whether or not the supermacro-block can be constructed by the input macro-block user data (step S26), and if the result of determination is "NO", the process returns to the step S12 and the above process is effected again.

If data of an amount corresponding to the data size of the supermacro-block is set in the second buffer memory 74, data is input from the second buffer memory 78 to the supermacro-block de-interleave section 88, macro-block user data is de-interleaved in the supermacro-block de-interleave section 88 to construct a supermacro-block (step S27), and the supermacro-block is supplied to the supermacro-block ECC section 90.

The supermacro-block ECC section 90 stores the SMB ECC code length from the macro-block header identifying section 84 as a parameter, and in the example of FIG. 7, it stores the SMB header lost position information from the memory controller 78 as a parameter, and performs the error correction in the de-interleaved supermacro-block according to the parameter (step S28).

After the error correction for the supermacro-block is effected, the error process is effected (step S30) if an error is present in the supermacro-block (step S29). For example, a signal informing that an error indicated by the broken lines in FIG. 4 or FIG. 7 is present is input to the controller 66 and this state is transmitted to the layer 4 and layer 2. Further, if no error is present (step S29), the data is supplied to the subset element constructing section 92 as subset element user data 152.

The subset element constructing section 92 stores the SSE header and SSE user data size 150 from the macro-block header identifying section 84 as parameters, checks whether or not a necessary amount of subset element user data has been input, that is, whether the subset element can be constructed or not according to the parameters (step S31), and if the result of checking is "NO", the process returns to the step S26 and the above process is effected again.

On the other hand, if a necessary amount of subset element user data 152 has been input from the supermacro-block ECC section 90, the SSE header and SSE user data size 150 from the macro-block header identifying section 84 are attached to the subset element user data 152 to construct a subset element and the subset element is output as 3-SDU$_1$ to the layer 4 in the unit of subset element (step S32).

In the above explanation, blocks are linked to construct a macro-block, and macro-blocks are linked to construct a supermacro-block, but it is possible to directly construct a supermacro-block by linking blocks without creating macro-blocks.

Next, the layer 4 and the layer 5 are explained in detail.

The layer 4 creates a subset by linking subset elements from the layer 3 and sends the subset to the layer 5. The layer 5 mainly functions as a file management system and sends data to the application process in the unit of subset. Next, a case wherein MS-DOS (which is a trademark of U.S. Microsoft Corporation) is used as the file management system in the layer 5 is explained.

When managing the MMP reproducing device 28, that is, the layers up to the layer 3 on the DOS base, DOS can regard the MMP reproducing device 28 as a block type device or character type device.

First, a case wherein the MMP reproducing device 28 is regarded as a block type device is explained.

Figure 14:
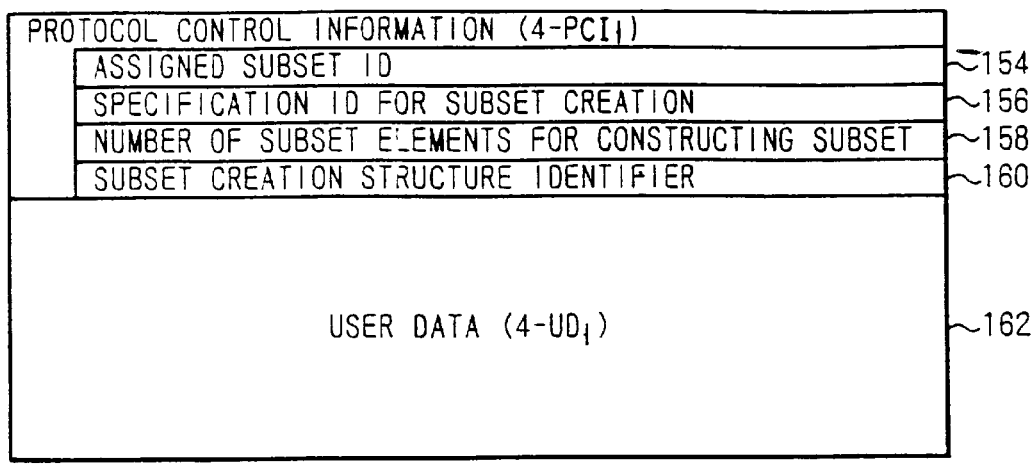
FIG. 14 is a diagram showing an example of the structure of subset element data.

FIG. 14 is a diagram showing an example of the structure of 4-PDU$_1$ (subset element data) output from the layer 3 and input to the layer 4, and the data is constructed by an assigned subset ID 154, specification ID 156 for subset creation, number 158 of subset elements for constructing the subset, and subset creation structure identifier 160 as 4-PCI$_1$ and user data (subset element user data 152) as 4-UD$_1$. This is different from the example of the structure shown in FIG. 12, but it is possible to contain the set specification identifying code 144, user data format type 146, subset element linking information 148, subset element user data size 150 and the like.

Since subset elements are linked to create a subset in the layer 4, the assigned subset ID 154 is used as a number for indicating a corresponding one of members of the subset to which the subset element data belongs. As described before, the subset indicates recognizable information unit data. That is, the macro-block and supermacro-block contain multimedia information such as sound and picture and each of data masses obtained by dividing the above block into data masses each of which is limited to information relating only to sound or information relating only to picture so as to be recognized as one information unit is called a subset.

The specification ID 156 for subset creation is information indicating a standard level at which it is determined that the subset is completed. That is, if it is supposed that a subset cannot be constructed until all of the subset elements are collected, the next process cannot be started when a subset element is not input from the layer 3 for some error. Therefore, in order to permit the next process to be started even in such a case, that is, in order to permit data to be transferred to the application and reproduced even if the quality is somewhat lowered, a creation standard level is set at which the subset can be constructed if, for example, 90% of the subset elements are collected. A plurality of such creation standard levels are provided and the specification ID 156 is used as a number for selecting one of the standard levels.

The number 158 of subset elements for constructing the subset is information indicating the number of subset elements constructing the subset.

The subset creation structure identifier 160 is information for identifying the linking method if a plurality of methods of linking the subsets are provided.

Figure 15A:
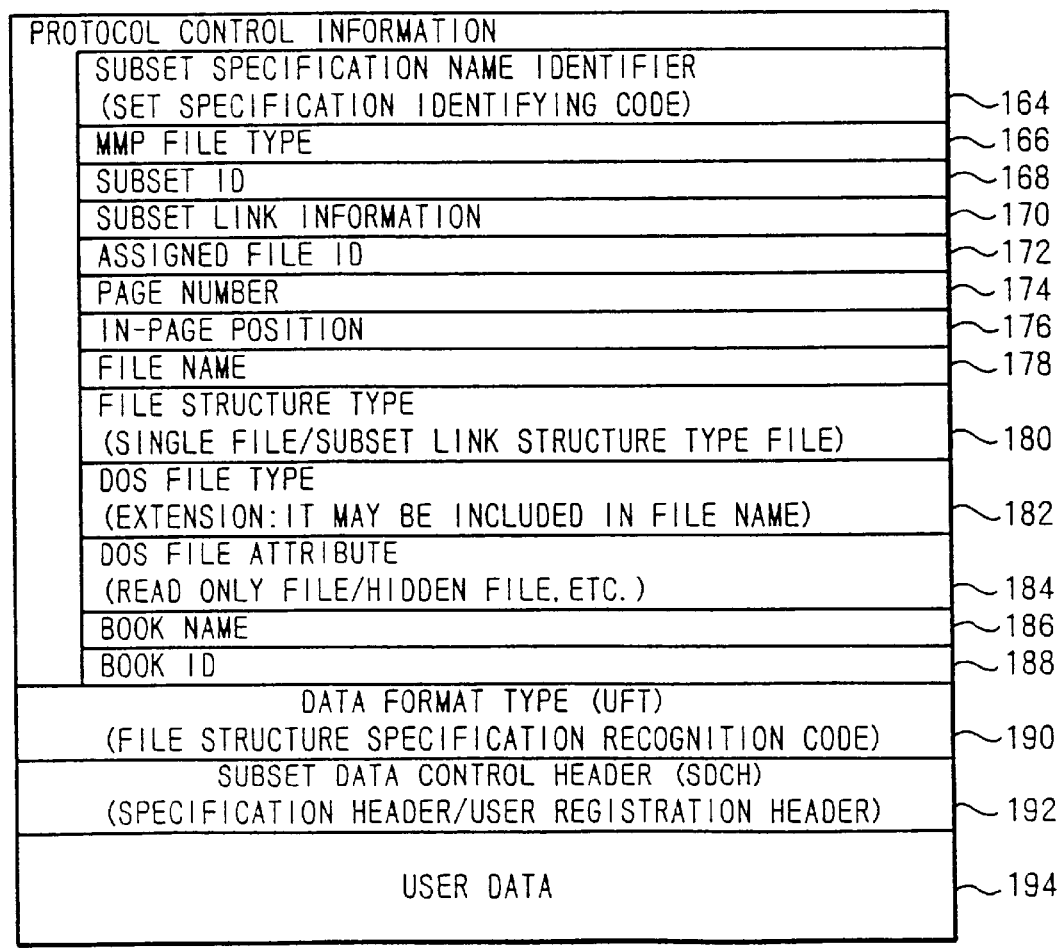

FIG. 15A and FIG. 15B are diagrams showing the structure of the subset constructed by the layer 4. A file is constructed by collecting some subsets, but the subset (which is hereinafter referred to as a head subset) which is set in the head position of the file has a different structure from the subset (which is hereinafter referred to as a general subset) which is set in the other position.

As shown in FIG. 15A, the head subset includes a subset specification name identifier 164, MMP file type 166, subset ID 168, subset link information 170, assigned file ID 172, page number 174, in-page position 176, file name 178, file structure type 180, DOS file type 182, DOS file attribute 184, book name 186 and book ID 188 as a subset header, user data format type (UFT) 190, subset data control header (SDCH) 192 and user data 194.

Further, as shown in FIG. 15B, the general subset includes a subset specification name identifier 164, MMP file type 166, subset ID 168, subset link information 170, assigned file ID 172, page number 174, in-page position 176 and book ID 188 as a subset header, user data format type (UFT) 190, subset control header (SDCH) 192, and user data 194.

The subset data control header (SDCH) 192 is a control header for restoring data limited to sound, data limited to image, data limited to text, or data containing a combination of sound, image and text into recognizable information. For example, it defines the compression system and the like.

Further, the subset header is information only necessary for managing the subset and contains various parameter information items which may be required by DOS. The parameters are only listed simply because they may be effectively used in the application, and all of them are not always necessary. Further, the order is not limited to the above case.

That is, the subset specification name identifier 164 may be the subset specification identifying code itself or may include the subset specification identifying code.

The MMP file type 166 is explained below. That is, as will be described later, files include two types of files: index file and general file. The index file corresponds to a table of contents. For example, when the transmission medium 30 is formed in the form of a book having plural pages, the index file is arranged at a head of the book and is a file on which a list of contents indicating the pages of the respective files of a book is described. In a general block type device, that is, a disk such as a floppy disk or hard disk, specified file directory entry and FAT (File Allocation Table) are set in the disk and information of directory entry, that is, file name, first sector or cluster number of the file name which is something like a table of contents is described there. Therefore, in order to deal with the MMP reproducing device as a block type device which is equivalent to the above disk, it is necessary to prepare a file corresponding to the FAT and file directory entry as an index file. The MMP file type 166 is information used for determining whether the file is the index file or a general file.

The subset ID 168 is an ID number of the subset, and the subset link information 170 is information used for linking subsets to create a file. The assigned file ID 172 is information indicating a corresponding one of members of the file to which the subset belongs. The page number 174 and in-page position 176 are information items indicating the position of a page of the book in which the subset itself is provided. The file name 178 is information indicating the file name.

The file structure type 180 is information indicating that the file is a single file or a subset link structure type file. It indicates that the head subset forms one file, that is, a single file, or the file is created by a plurality of subsets.

The DOS file type 182 indicates the type of a file determined by DOS and is generally called an extension. Therefore, it may be included in the file name 178. Further, the DOS file attribute 184 indicates the attribute such as read only file and hidden file determined by DOS.

The book name 186 and book ID 188 are the name of a book and ID number specifying the book when the MMP code is formed in a book form.

The user data format type (UFT) 190 identifies the structure of the subset data control header (SDCH) 192 itself and the parameters set therein. That is, as described before, if the subset is a sound subset, for example, parameters such as a compression system, parameter associated with the compression system, sampling frequency, quantization and the like are set in the SDCH 192, plural types of the SDCH 192 are prepared, and the UFT 190 is used as information for selecting one of the SDCH type.

FIG. 16A to FIG. 16C are diagrams indicating various applications of the subset specification name identifier 164.

FIG. 16A shows a general structure and the subset includes a subset specification name identifier 164, subset header 196 containing the above various information items, user data format type (UFT) 190, subset data control header (SDCH) 192, and user data 194.

FIG. 16B shows a case wherein the subset header 196 is omitted since the content of the subset header 196 is made clear by the subset specification name identifier 164, for example, "001". However, in this case, since the subset data control header (SDCH) 192 and user data 194 can identify the structures or the structures of the parameters only after recognizing the user data format type (UFT) 190, the UFT 190 is left behind.

FIG. 16C shows a case wherein the subset header 196 is omitted since the content of the subset header 196 is made clear by the subset specification name identifier 164, for example, "002". However, in this case, since the subset data control header (SDCH) 192 and user data 194 can identify the structures or the structures of the parameters only after recognizing the user data format type (UFT) 190, the UFT 190 is left behind. Further, in this case, since the structure of the SDCH 192 or the structure of the parameters is made clear by the UFT 190, the SDCH 192 is omitted.

FIG. 17A and FIG. 17B are diagrams showing the structure of a general file in a case where the file is constructed by linking subsets. FIG. 17C is a diagram showing the structure of an index file.

As shown in FIGS. 17A and 17B, the general file has a head subset arranged in the first position and a plurality of general subsets successively arranged after the head subset.

On the other hand, in the case of index file, it is constructed by one subset, the subset header has the same structure as the head subset, and indices 198 corresponding to so-called file directory entry and FAT are described as the contents of use data as shown in FIG. 17C. The indices 198 indicate respective files. Of course, the index file can be constructed by linking some subsets.

Figure 18:
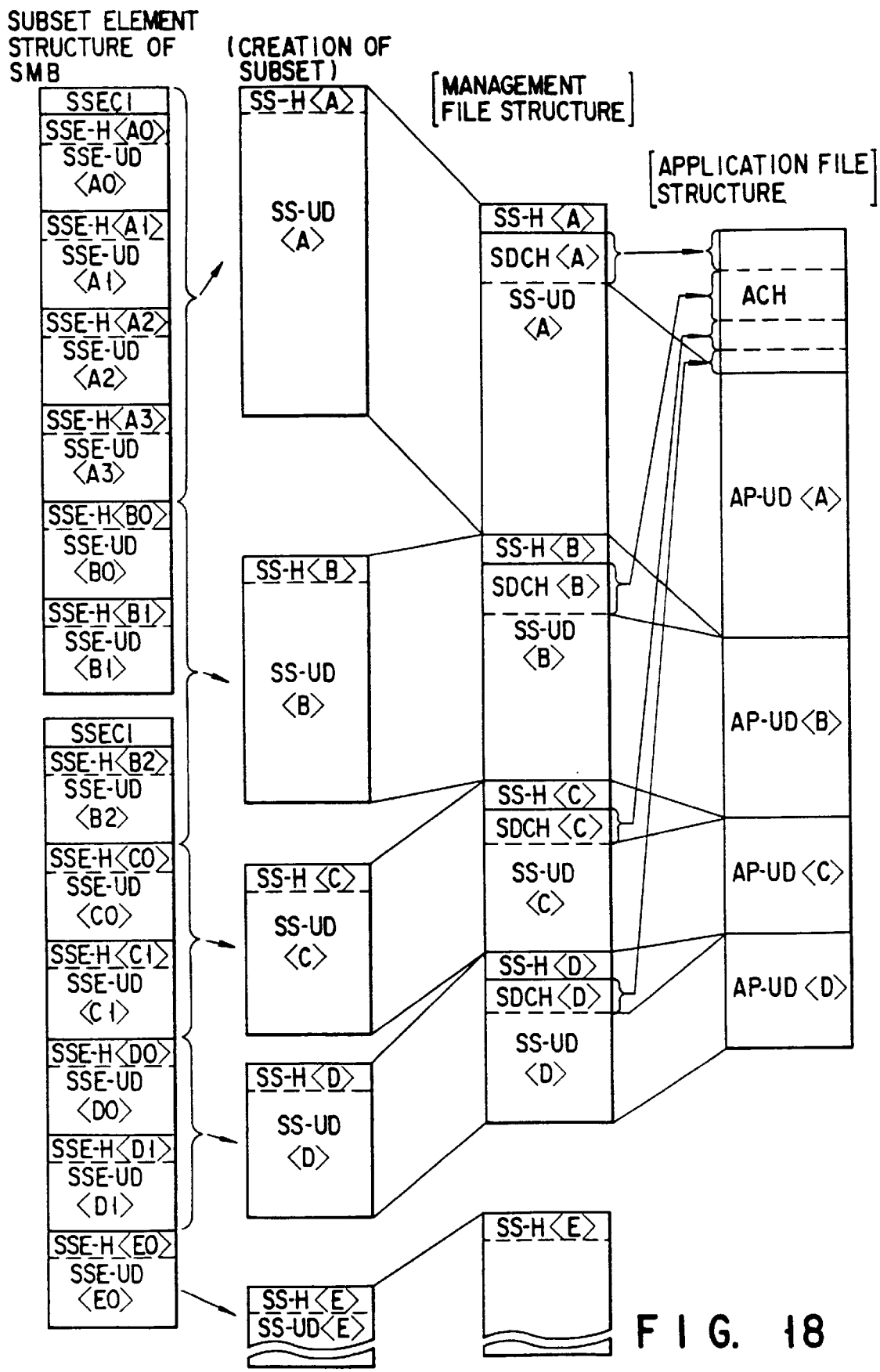
FIG. 18 is a diagram showing the relation between a subset element, subset and file.

FIG. 18 is a diagram showing the relation between the subset element, subset and file. In FIG. 18, SSECI indicates subset element construction information, SSEH<An> indicates an nth subset element header of a subset A, SSE-UD<An> indicates nth subset element user data of the subset A, SS-H<A> indicates an subset header of the subset A, SS-UD<A> indicates subset user data of the subset A, ACH indicates an application control header, and AP-UD<A> indicates application user data A.

That is, subset elements in the supermacro-block from the layer 3 are combined in the layer 4 to create a subset. The subsets are linked to make one file. At this time, since the subset basically has a structure containing the subset header, subset data control header and subset user data, it is not necessary to recognize the content of the subset user data, and information at least required for management and indicating the type of media which indicates that the information is sound or image is described in the subset data control header. Further, when it is treated on DOS, it is not necessary to observe the subset data control header and subset user data and it is only necessary to effect the file management by use of only the subset header. When the file format treated by the application process is finally attained, the subset headers or subset data control headers of the subsets A, B, C, D are collected and linked to form one application control header. Alternatively, a specified subset header itself or user data of a specified subset itself will make one application control header in some cases.

Information indicating the type of media of individual user data and a process which must be effected to decompress or recognize the media is contained in the application control header. In addition, information indicating the arrangement of and the relation between data items corresponding to individual subsets and the structure thereof as viewed from the application side is described. For example, the information indicates the arrangement on the paper of the application user data items A, B, C, D or, if they are not arranged and relate to sounds, an operation for processing images to inevitably and simultaneously output sounds.

Next, the constructions of the layers 4 and 5 when the MMP reproducing device 28 is regarded as a block type device are explained with reference to the functional diagram of FIG. 19.

The layer 4 includes a controller 200 (corresponding to the subset element link information reading module 60) containing an error processing section 200A, processing parameter storing memory 202, subset creating section 204 (corresponding to the subset element link module 62), file type identifying section 206, necessary parameter extracting/analyzing section 208 in index file, logical sector number/MMP file recording position converting table creating/selecting section 210, DOS format data matching processing section 212, command analyzing section 214, logical sector number analyzing section 216, and corresponding readout file reading request section 218. Among the above elements, the file type identifying section 206 to the corresponding readout file reading request section 218 are provided as a device driver MMP.SYS, for example. That is, the MMP.SYS effects the read/write process in the sector unit and stores data in a memory location designated by DOS.

Further, the layer 5 includes MSDOS.SYS 220 as the file management system 64, and MSDOS.SYS management readout buffer 222 used as a main memory location designated by the MSDOS.SYS 220.

The MSDOS.SYS 220 of the layer 5 outputs a request for reading a certain file. For example, it outputs a command packet for reading a file with a file name of "XXXXXXXX.MMP".

The command analyzing section 214 of the layer 4 analyzes the content of a command packet output from the MSDOS.SYS 220, and if it is a read command, it supplies a logical sector number contained in the command packet to the logical sector number analyzing section 216.

That is, the MSDOS.SYS 220 basically designates only the sector number of the disk, that is, issues an instruction for reading a sector of a specified number, and the logical sector number analyzing section 216 interprets the logical sector number from the MSDOS.SYS 220. When reading a file, the MSDOS.SYS 220 issues an instruction to first read a portion like an index portion in which the format is defined by DOS, or the file directory and FAT. Since the sector number of the file directory entry is previously determined and set to "first", for example, the MSDOS.SYS 220 outputs the sector number together with the read command as a command packet. When the sector number corresponding to the file directory entry is specified by the MSDOS.SYS 220, the logical number analyzing section 216 instructs the corresponding readout file reading request section 218 to read an in-page position corresponding to the specified sector number.

The corresponding readout file reading request section 218 instructs the user to read or scan a corresponding portion of a corresponding page of the book by display or sound.

Then, data is derived as 3-$SDU_1$ by use of the service functions of the layers up to the layer 3 and is input to the subset creating section 204 as 4-$PDU_1$. Further, the controller 200 receives a status signal 3-$SDU_2$ as 4-$PDU_2$ and controls the subset creating section 204 according to the function execution starting/ending control signal thereof.

When starting of the function execution is instructed by the controller 200, the subset creating section 204 creates a subset by use of subset elements from the layer 3 according to the parameters such as a subset specification name identifier, subset element header structure and the like stored in the processing parameter storing memory 202. Then, the created subset is supplied to the file type identifying section 206.

The file type identifying section 206 interprets the subset header 196 of the subset created in the subset creating section 204 and determines whether the subset is part of the index file or part of the general file according to the MMP file type 166 contained therein. Further, the file type of MMP, that is, information indicating the index file or general file from the logical sector number analyzing section 216 is set as a parameter in the file type identifying section 206, and the file type identifying section 206 compares the MMP file type set from the logical sector number analyzing section 216 with the MMP file type interpreted from the subset header 196. If the compared file types are different from each other, the error processing section 200A of the controller 200 is caused to effect a necessary error process.

For example, when the MSDOS.SYS 220 instructs to read the file directory entry as described above, this corresponds to an instruction of reading an index file and the MMP file type indicating the index file is set as a parameter. Therefore, since the succeeding process cannot be effected if the compared file types are different from each other when the subset header 196 is interpreted, the error processing section 200A sends error information to the MSDOS.SYS 220 and causes the same to instruct the reading of index file again.

If the file is an index file as requested, the file type identifying section 206 sends the index file to the necessary parameter extracting/analyzing section 208 in index file.

The necessary parameter extracting/analyzing section 208 in index file extracts and analyzes necessary parameters in the supplied index file. That is, it extracts the file name and a first page number and in-page position of a corresponding file from each index 198 described in the user data of the index file and supply them to the logical sector number/MMP file recording position converting table creating/selecting section 210.

The logical sector number/MMP file recording position converting table creating/selecting section 210 creates a conversion table according to the information. That is, a list is made by adequately attaching a logical sector number, and setting a file position corresponding to the logical sector number, that is, the first page number and in-page position of a corresponding file in correspondence to the logical sector number. Further, FAT of entered files is created and set in the conversion table.

The DOS format data matching processing section 212 receives the contents of the index file from the necessary parameter extracting/analyzing section 208 in index file and FAT information from the logical sector number/MMP file recording position converting table creating/selecting section 210, convert them to match with the data form of the DOS format, that is, the file directory entry form, and writes them as 4-SDU$_1$ in the sector unit into the MSDOS.SYS management readout buffer 222 of the layer 5, that is, the management buffer memory of the MSDOS.SYS 220.

As a result, the MSDOS.SYS 220 can get information on the list of file directory entry by reading out data from the MSDOS.SYS management readout buffer 222.

Then, for example, if it is detected that a corresponding file name is present, the MSDOS.SYS 220 outputs the sector number therein to the command analyzing section 214. The sector number of this case corresponds to a sector number determined by the logical sector number/MMP file recording position converting table creating/selecting section 210

The logical sector number analyzing section 216 analyzes a file and a position of the file which correspond to the sector number analyzed by the command analyzing section 214 by observing the conversion table created by the logical sector number/MMP file recording position converting table creating/selecting section 210. Then, it supplies the page number and in-page position corresponding to the sector number to the corresponding readout file reading request section 218. As a result, the corresponding readout file reading request section 218 issues an instruction of reading a corresponding portion of a corresponding page to the user.

Then, a subset is created in the subset creating section 204 by use of subset elements read by the functions of the layers up to the layer 3 and the file type is identified by the file type identifying section 206. However, at this time, it is necessary to read a general file, and therefore, whether the file type is a general file or not is determined. If the index file is read, it is processed as an error.

If it is a general file, data is sent to the DOS format data matching processing section 212 in the subset unit, converted to match data of DOS format, and stored in the MSDOS.SYS management readout buffer 222 of the layer 5.

Figure 20B:
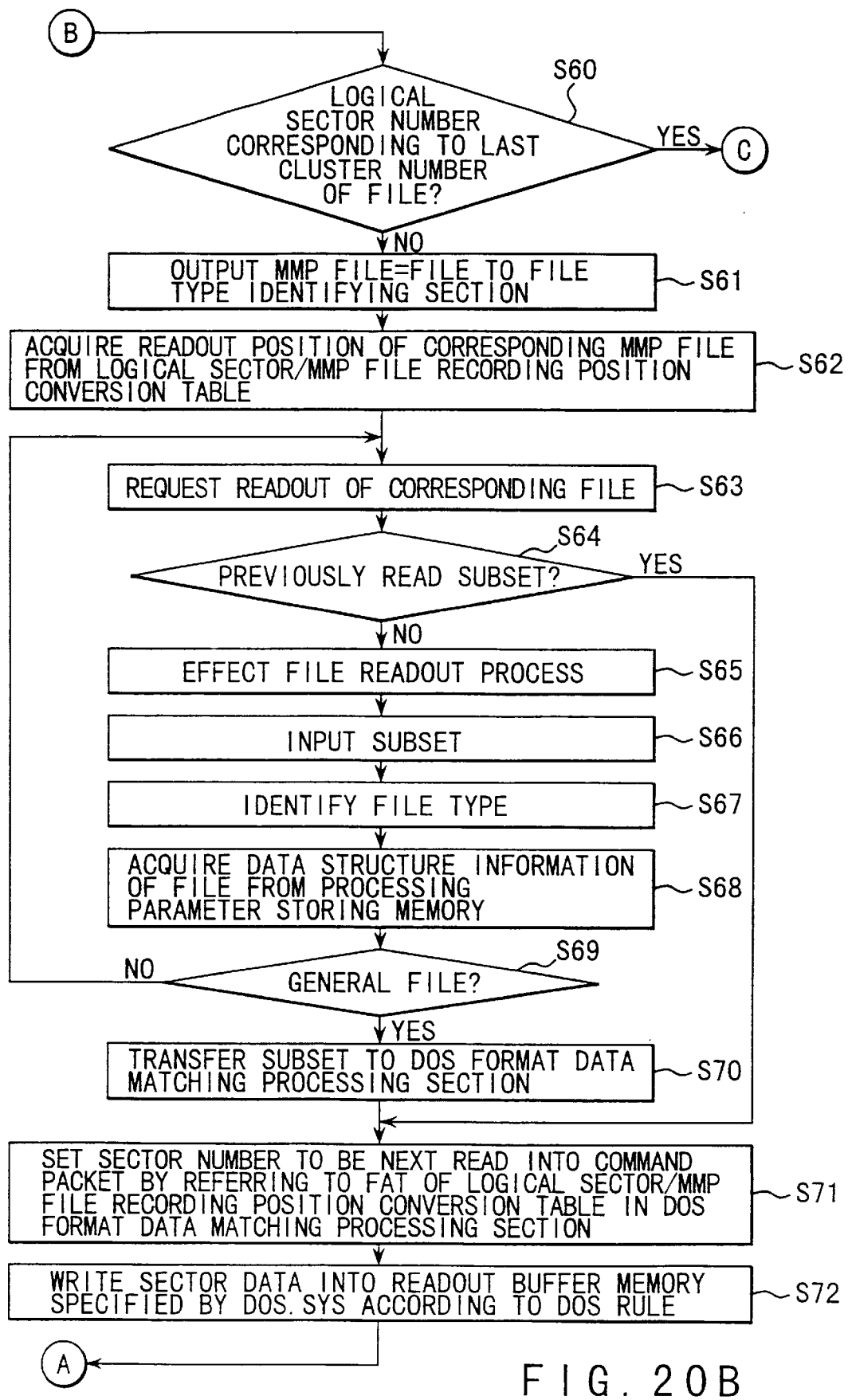
Figure 20C:
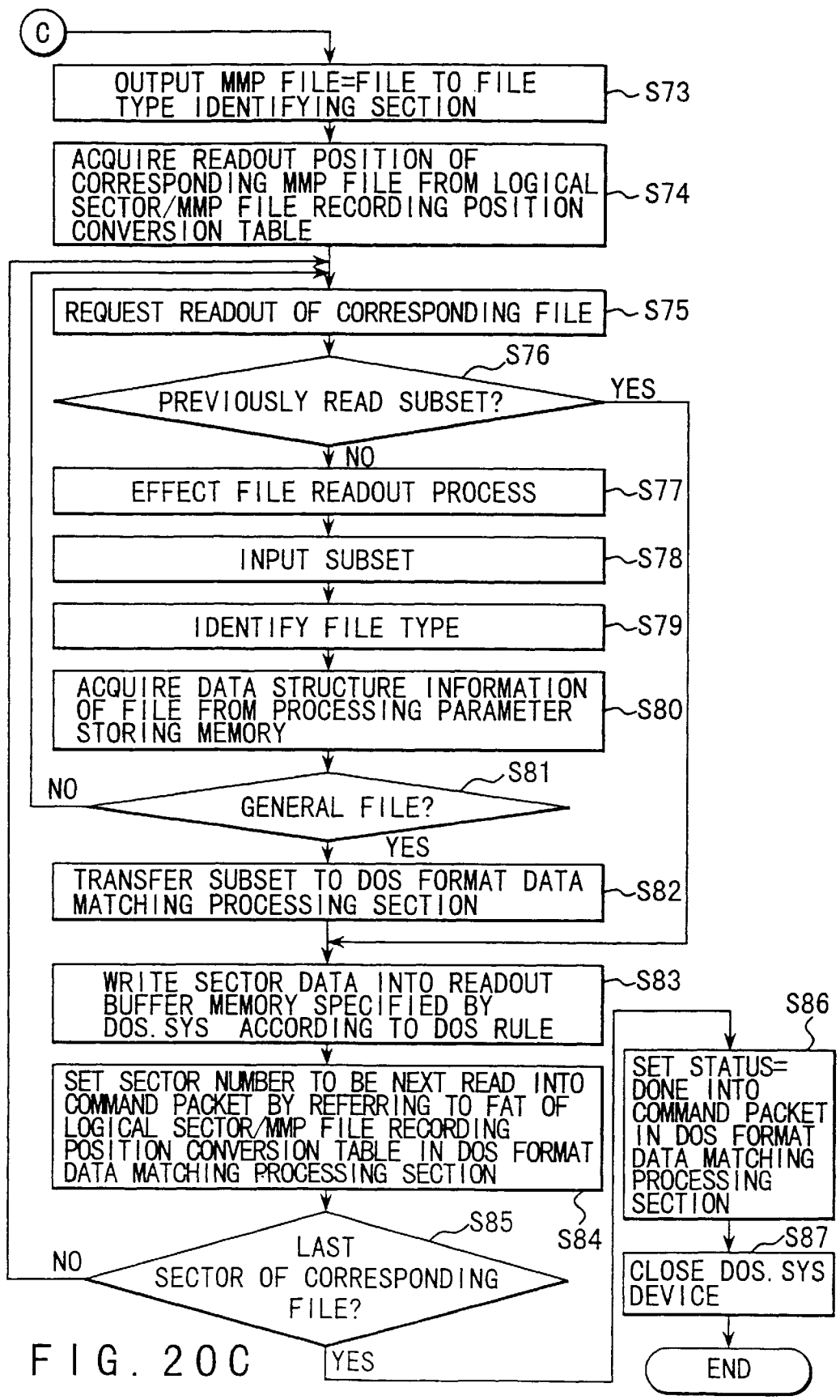

FIG. 20A to FIG. 20C are a sequence of flowcharts showing the operation of the above construction.

First, the MSDOS.SYS 220 opens the device driver MMP.SYS (step S41) and outputs a command packet as described before (step S42). That is, at this time, a read instruction or an instruction of reading a certain sector is set by the MSDOS.SYS 220 and output in a packet form.

In MMP.SYS, first, the command is analyzed in the command analyzing section 214 (step S43) and whether it is a read command or not is determined (step S44). If it is not a read command, the process of the flowchart is ended, that is, another process such as a write process is started.

If it is a read command, the logical sector number is analyzed in the logical sector number analyzing section 216 (step S45) and whether or not the result of analysis is a logical sector number corresponding to directory entry is determined (step S46).

If it is "YES", a file corresponding to the logical sector number is an index file as described before, and therefore, the process is effected to read the index file, but prior to this process, information of the MMP file type, that is, information indicating that MMP file=index file is first output to the file type identifying section 206 (step S47). Then, reading of the corresponding file is requested to the corresponding file reading request section 218 (step S48).

As a result, the corresponding file reading request section 218 instructs the user to read the corresponding file, that is, a corresponding portion of a corresponding page of the book by use of a scanner (not shown). If the user scan the index file by use of the scanner according to the instruction, the readout process of the index file is effected by using the functions of the layers up to the layer 3, and as a result, a subset is created in the subset creating section 204 (step S49).

If the subset is input to the file type identifying section 206 of MMP.SYS, the file type identifying section 206 identifies the file type of the subset (step S51) and determines whether the identified file type is an index file or not (step S52) since information indicating that MMP file=index file from the logical sector number analyzing section 216 is set. If it is not an index file, an error process is effected, and the process returns to the step S48 to issue a readout request of the corresponding file again.

On the other hand, if it is an index file, the file type identifying section 206 acquires data structure information of the index file from the processing parameter storing memory 202 (step S53). That is, in order to read out or interpret an index file, data structure information registered in the processing parameter storing memory 202 and indicating the structure with which the index file is described is read out. Then, the index file and the readout data structure information are supplied to the index file necessary parameter extracting/analyzing section 208.

The index file necessary parameter extracting/analyzing section 208 interprets the index file by use of the data structure information, extracts necessary parameters, for example, information of the page number and in-page position of the entered file from the index file, and supplies them to the logical sector number/MMP file recording position converting table creating/selecting section 210 (step S54).

The logical sector number/MMP file recording position converting table creating/selecting section 210 sets the page numbers and in-page positions of the entered files into an object table logical sector number/MMP file recording position converting table (step S55). That is, a table in which logical sector numbers are previously listed is provided and information of the page number and in-page position corresponding to the logical sector number is filled into a table area provided in correspondence to the logical sector number.

Further, the logical sector number/MMP file recording position converting table creating/selecting section 210 creates FAT of the entered file and sets it into the logical sector/MMP file converting table (step S56). The reason why FAT is set into the table is as follows. That is, the number of bytes of the sector is previously determined and the MSDOS.SYS 220 manages the file in the unit of cluster formed by collecting a preset number of sectors. When an instruction is issued from the MSDOS.SYS 220, a sector number corresponding to the cluster number is specified, and therefore, when the MMP file is read out, it becomes necessary to divide the file according to the size thereof. For example, in a case where data of subsets corresponding to a plurality of clusters is present, cluster numbers must be attached to provide divisions so that the data can be managed by the MSDOS.SYS 220. At this time, since information indicating the link between the clusters or a cluster to be next specified is described in FAT, it becomes impossible to inform the MSDOS.SYS 220 of a sector which must be next read if the conversion table for FAT is not provided.

The DOS format matching data matching processing section 212 receives the content of the index file from the necessary parameter detecting/analyzing section 208 in index file and acquires the logical sector number and the like set from the logical sector number/MMP file recording position converting table creating/selecting section 210, and creates and discharges the directory entry according to the DOS rule of the readout file (step S57).

The discharged directory entry is written into the readout buffer memory specified by the MSDOS.SYS 220, that is, into the MSDOS.SYS management readout buffer 222 (step S58).

The MSDOS.SYS 220 receives the directory entry from the buffer 222, interprets the same, sets a read command and a sector number corresponding to the first cluster number of the requested file into a command packet (step S59), returns to the step S42 and outputs the command packet. That is, the MSDOS.SYS 220 receives the content of the directory entry, interprets the same therein, determines a portion to be next read, and then outputs a corresponding sector number.

The above process is repeatedly effected to receive all of the directory entries.

Next, the MSDOS.SYS 220 side interprets the thus obtained directory entry, and if a file for a certain purpose is detected, the MSDOS.SYS 220 outputs the logical sector number of the file by use of a command packet. In this case, it is determined in the step S46 that it is not the logical number corresponding to the directory entry and the process proceeds to the step S60.

The logical sector number analyzing section 216 checks whether or not the logical sector number requested from the MSDOS.SYS 220 is the logical sector number corresponding to the last cluster number of the file by referring to the table created in the logical sector number/MMP file recording position converting table creating/selecting section 210 (step S60). Then, if it not the last logical sector number, information of MMP file type or information indicating that MMP file=general file is output to the file type identifying section 206 (step S61). Next, it acquires the readout position of the corresponding MMP file by referring to the table created in the logical sector number/MMP file recording position converting table creating/selecting section 210 (step S62), and issues a request of readout of the corresponding file to the corresponding file reading request section 218 (step S63).

The corresponding file reading request section 218 determines whether or not the readout position of the requested corresponding file is a position corresponding to the previously read subset (step S64). The reason for this is as follows. That is, in a case of the general disk, it is necessary to alternately and repeatedly effect the readout of object sectors for one cycle and the specification of object sectors by DOS. In this embodiment, since the sector discharged to the layer 5 is smaller than the subset, the process of collectively reading out the subset and discharging it in the unit of sector is effected. Therefore, since there occurs a possibility that the sector specified by the MSDOS.SYS 220 may be contained in the subset which has been already read out, it is checked here. If it is the subset already read out, the process proceeds to the step S71 as will be described later.

On the other hand, if it corresponds to the subset which is not yet read out, the corresponding file reading request section 218 instructs the user to read the corresponding file, that is, a corresponding portion of a corresponding page of the book by use of a scanner (not shown). The user scans the file according to the instruction by use of the scanner and effects the file reading process by use of the functions of the layers up to the layer 3, and as a result, a subset is created in the subset creating section 204 (step S65).

If the subset is input to the file type identifying section 206 of MMP.SYS (step S66), the file type identifying section 206 identifies the file type of the subset (step S67), acquires data structure information of the file from the processing parameter storing memory 202 (step S68), and interprets the content of the subset. As a result, whether the file is an index file or general file can be determined. Since information indicating that MMP file=general file from the logical sector number analyzing section 216 is set, if the identified file type is not a general file (step S69), the process returns to the step S63 and a corresponding file reading request is issued again.

If it is a general file, the subset is supplied to the DOS format matching processing section 212 (step S70).

The DOS format matching processing section 212 sets a sector number to be next read into the command packet (step S71) by referring to FAT information of the conversion table created in the logical sector number/MMP file recording position converting table creating/selecting section 210 and writes readout sector data into the MSDOS.SYS management readout buffer 222 according to the DOS rule (step S72). That is, data is discharged in the data format according to the DOS rule, that is, in the unit of sector, but at this time, a sector number to be next read is set in the command packet and written into the buffer 222 in order to instruct the sector number to be next read to the MSDOS.SYS 220.

After this, the process returns to the step S42, and the above process is effected again.

Then, when the logical sector number requested from the MSDOS.SYS 220 coincides with a logical sector number corresponding to the end cluster number of the file (step S60), the process proceeds to the step S73.

That is, the logical sector number analyzing section 216 outputs information of the MMP file type, that is, information indicating that MMP file=general file to the file type identifying section 206 (step S73). Next, it acquires the readout position of the corresponding MMP file by referring to the table created in the logical sector number/MMP file recording position converting table creating/selecting section 210 (step S74), and issues a request of readout of the corresponding file to the corresponding file readout request section 218 (step S75).

The corresponding file readout request section 218 determines whether or not the readout position of the requested corresponding file is a position corresponding to the previously read subset (step S76). If it is the subset already read out, the process proceeds to the step S83 as will be described later.

On the other hand, if it corresponds to the subset which is not yet read out, the corresponding file readout request section 218 instructs the user to read the corresponding file, that is, a corresponding portion of a corresponding page of the book by use of a scanner (not shown). The user scans the file according to the instruction by use of the scanner and effects the file reading process by use of the functions of the layers up to the layer 3, and as a result, a subset is created in the subset creating section 204 (step S77).

If the subset is input to the file type identifying section 206 of MMP.SYS (step S78), the file type identifying section 206 identifies the file type of the subset (step S79), acquires data structure information of the file from the processing parameter storing memory 202 (step S80), and interprets the content of the subset. As a result, whether the file is an index file or general file can be determined. Since information indicating that MMP file=general file from the logical sector number analyzing section 216 is set, if the identified file type is not a general file (step S81), the process returns to the step S75 and a corresponding file reading request is issued again.

If it is a general file, the subset is supplied to the DOS format matching processing section 212 (step S82).

The DOS format matching processing section 212 writes readout sector data into the MSDOS.SYS management readout buffer 222 according to the DOS rule (step S83) and sets a sector number to be next read into the command packet (step S84) by referring to FAT information of the conversion table created in the table created in the logical sector number/MMP file recording position converting table creating/selecting section 210.

Then, it is determined whether the sector number is a last sector of the corresponding file, that is, whether it is a last sector of the last readout cluster requested by the MSDOS.SYS 220 (step S85), and if it is "NO", the process is started from the step S75 again.

Further, if it is the last sector of the corresponding file, that is it is the last sector which can be input for the MSDOS.SYS 220, the DOS format matching processing section 212 sets information indicating that status=DONE into the command packet (step S86).

After reading out the status from the MSDOS.SYS management readout buffer 222, the MSDOS.SYS 220 closes the device driver MMP.SYS (step S87) and terminates the file readout process.

Figure 21:
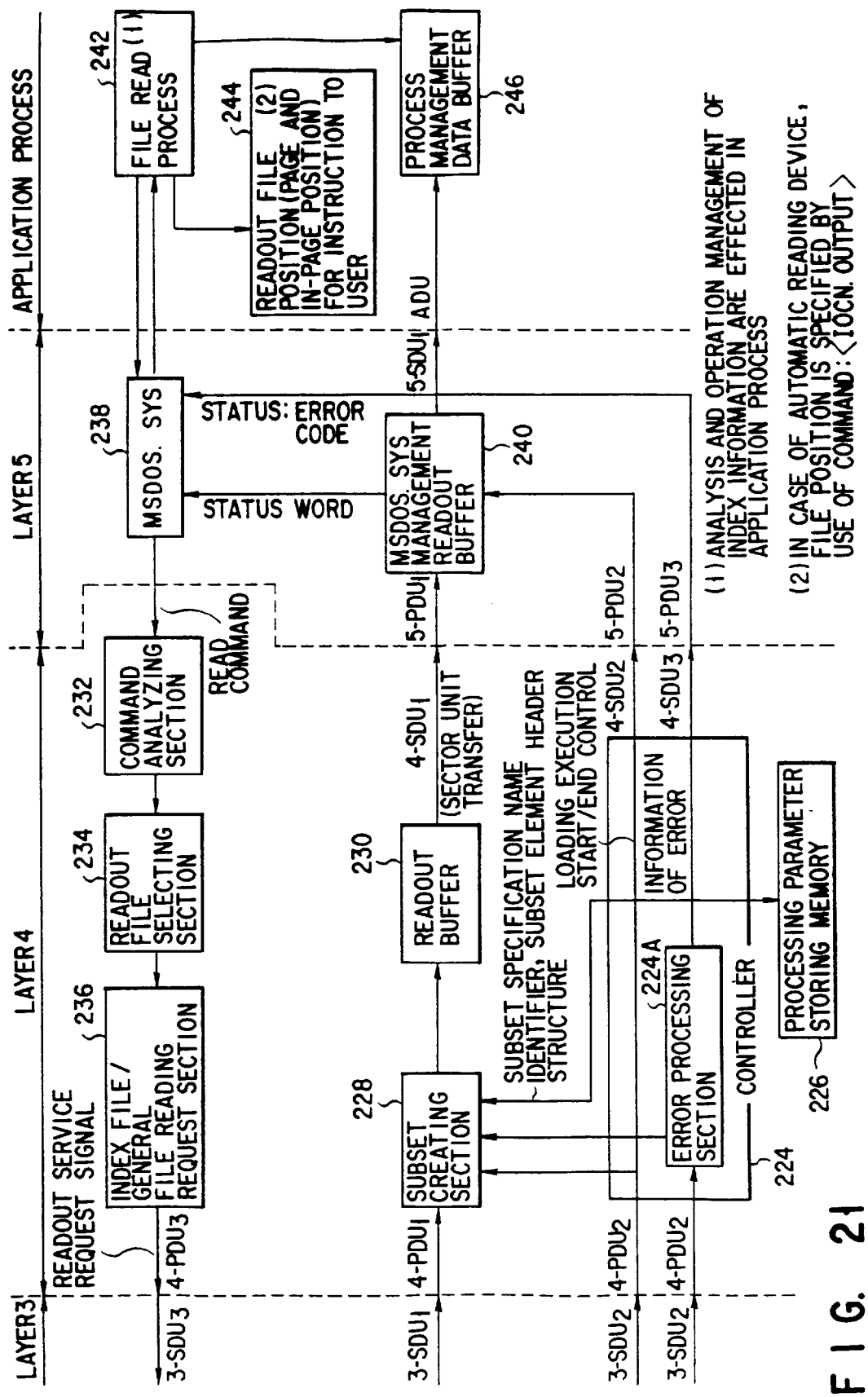
FIG. 21 is a functional block diagram showing the construction of the layers 4 and 5 when viewing the MMP reproducing device as a block type device.

Next, the constructions of the layers 4 and 5 and the application process when regarding the MMP reproducing device as a character type device are explained with reference to the functional block diagram of FIG. 21.

The layer 4 includes a controller 224 having an error processing section 224A, processing parameter storing memory 226, subset creating section 228, readout buffer 230, command analyzing section 232, readout file selecting section 234, and index file/general file reading request section 236. Among the above elements, for example, the readout buffer 230 to the index file/general file readout request section 236 are provided as a device driver MMP.SYS. That is, in this case, the MMP.SYS reads/writes data in the unit of byte and stores data into the memory location specified by the application.

Further, the layer 5 includes an MSDOS.SYS 238 as a file management system, and an MSDOS.SYS management readout buffer 240.

The application process includes a file read process 242, readout file position 244, and process management data buffer 246.

For example, the file read process 242 is a read subroutine in the application process and issues a file read request including the readout file position to the MSDOS.SYS 238. At the same time, the file read process 242 instructs the user to scan the file by use of a scanner (not shown) by means of a display (not shown) or sound outputting device (not shown).

The MSDOS.SYS 238 receives a request from the file read process 242 and outputs a read command.

The command analyzing section 232 of MMP.SYS analyzes the command, and if the command is a read command, it outputs a readout file position to the readout file selecting section 234.

The readout file selecting section 234 selects the readout file. In practice, since a file to be scanned is specified in the application process, this indicates the selecting operation by the user.

The index file/general file readout request section 236 outputs a readout service request to the layers up to the layer 3.

The subset creating section 228 creates a subset by the control of the controller 224 in the same manner as in the case of the block type device.

The readout buffer 230 temporarily stores the subset created by the subset creating section 228 and transfers the subset in the unit of byte to the MSDOS.SYS management readout buffer 240 which can be recognized from the MSDOS.SYS 238.

Then, data temporarily stored in the MSDOS.SYS management readout buffer 240 is held in the process management data buffer 246 as an application data unit.

FIG. 22 is a flowchart showing the operation of the above construction.

First, the file read process 242 is executed, a file read request containing the readout position is output to the MSDOS.SYS 238, and at this time, the readout position is indicated to the user (step S91).

The MSDOS.SYS 238 opens the file (step S92), opens the device driver MMP.SYS (step S93) and outputs a command packet (step S94).

The command analyzing section 232 analyzes the command (step S95), and if the command is not the read command, the process proceeds to a process corresponding to the command.

On the other hand, if the command is the read command, it issues a corresponding file reading request to the readout file selecting section 234 (step 97) so as to instruct the user to effect the operation for reading.

The index file/general file reading request section 236 determines whether or not the readout position of the corresponding file requested is a position corresponding to the previously read subset (step S98), and if it corresponds to the previously read subset, the process proceeds to the step S102 which will be described later.

On the other hand, if it corresponds to a subset which is not yet read, the index file/general file reading request section 236 effects the file readout process by use of the functions of the layers up to the layer 3 (step S99).

As a result, since a subset element is input from the layer 3 to the subset creating section 228 (step S100), a subset is created in the subset creating section 228 and output to the readout buffer 230 (step S101).

Then, data is transferred in the unit of byte from the readout buffer 230 to the MSDOS.SYS management readout buffer 240 (step S102).

After completion of the data transfer, the controller 224 sets the status word of the command packet to DONE by 4-SDU$_2$ (step S103).

The MSDOS.SYS 238 determines whether readout of the subset is completed or not (step S104), and if the result of determination is "NO", the process returns to the step S98 and the above process is effected again.

On the other hand, if readout of the subset is completed, the MSDOS.SYS 238 determines whether readout of the file is completed or not (step S105), and if the result of determination is "NO", the process returns to the step S97 and the above process is effected again.

Further, if readout of the file is completed, it transfers the readout file data from the MSDOS.SYS management readout buffer 240 to the process management data buffer 246 (step S106).

Then, the MSDOS.SYS 238 closes the device driver MMP.SYS (step S107), closes the file (step S108), and terminates the process.

The process management data buffer 246 is not always necessary, and it may be sufficient only to inform the storage location of the MSDOS.SYS management readout buffer 240.

This invention has been described based on the embodiment, but this invention is not limited to the above embodiment and can be variously modified without departing from the technical scope thereof. The contents of this invention can be summarized as follows.

(1) An information reproducing device comprising:
first hierarchical processing means (32, 34, 36) for optically reading a code pattern from an information recording medium (30) having a portion in which multimedia information containing at least one of audio information, video information and digital code data is recorded in the form of code pattern (10) which can be optically read, converting the code thus read into code data as an image, adding information relating to the reading as first processing information to the code data and then outputting the same;

second hierarchical processing means (38, 40, 42, 44, 46) for recognizing first processing information output from the first hierarchical processing means to process code data output from the first hierarchical processing means and creating blocks by collecting the code data for each given unit and outputting the blocks;

third hierarchical processing means (48, 50, 52, 54, 56, 58) for extracting second processing information at least necessary for creating supermacro-blocks of a larger given unit by collecting the blocks output from the second hierarchical processing means from the code data of the blocks and recognizing the thus extracted data, creating supermacro-blocks based on the second processing information, extracting third processing information for effecting the process of coping with the error from the supermacro-block and recognizing the thus extracted third processing information, effecting the process of coping with the error of the supermacro-block based on the third processing information, and outputting subset elements created by distributing the supermacro-block based on the third processing information;

fourth hierarchical processing means (60, 62) for extracting fourth processing information at least necessary for creating a subset from the subset elements output from the third hierarchical processing means from the subset element and outputting a subset created based on the fourth processing information, the subset being constructed by codes of a given unit which permits the multimedia information to be restored; and output means (64) for outputting the subset output from the fourth hierarchical processing means as the restored multimedia information;

wherein the third hierarchical processing means includes:
block code data linking means (66, 68, 70, 74, 76, 78) for re-constructing code data (block user data) of the block by the second processing information (block header);

macro-block header constructing means (66, 70, 72, 76, 78) for collecting a plurality of blocks of first data provided in given positions in the respective block code data linked by the block code data linking means to construct macro-block header information; and supermacro-block constructing means (78) for collecting second data other than the first data in the respective block code data to construct the supermacro-block according to the macro-block header constructed by the macro-block header constructing means.

That is, an information reproducing device and an information recording medium can be provided in which since the size of the subset element and linking information can be described in the macro-block header according to the structure of the application file, it becomes possible to suppress attachment of invalid data to minimum and record a larger amount of valid data, and as a result, the code pattern can be reproduced with higher reliability and the highly reliable operation can be maintained even if the structure of the code pattern itself is changed in the future.

(2) An information reproducing device comprising:
first hierarchical processing means (32, 34, 36) for optically reading a code pattern from an information recording medium (30) having a portion in which multimedia information containing at least one of audio information, video information and digital code data is recorded in the form of code pattern (10) which can be optically read, converting the code thus read into code data as an image, adding information relating to the reading as first processing information to the code data and then outputting the same;

second hierarchical processing means (38, 40, 42, 44, 46) for recognizing first processing information output from the first hierarchical processing means to process code data output from the first hierarchical processing means and creating blocks by collecting the code data for each given unit and outputting the blocks;

third hierarchical processing means (48, 50, 52, 54, 56, 58) for extracting second processing information at least necessary for creating supermacro-blocks of a larger given unit by collecting the blocks output from the second hierarchical processing means from the code data of the blocks and recognizing the thus extracted data, creating supermacro-blocks based on the second processing information, extracting third processing information for effecting the process of coping with the error from the supermacro-block and recognizing the thus extracted third processing information, effecting the process of coping with the error of the supermacro-block based on the third processing information, and outputting subset elements created by distributing the supermacro-block based on the third processing information;

fourth hierarchical processing means (60, 62) for extracting fourth processing information at least necessary for creating a subset from the subset element output from the third hierarchical processing means from the subset element and outputting a subset created based on the fourth processing information, the subset being constructed by codes of a given unit which permits the multimedia information to be restored; and output means (64) for outputting the subset output from the fourth hierarchical processing means as the restored multimedia information;

wherein the third hierarchical processing means includes:

block code data linking means (66, 68, 70, 74, 76, 78) for re-constructing block code data by the second processing information;

macro-block header constructing means (66, 68 70, 72, 76, 78, 80) for collecting a plurality of blocks of first data provided in given positions in the respective block code data linked by the block code data linking means to construct a macro-block header;

macro-block header error correction means (82) for subjecting the macro-block header constructed by the macro-block header constructing means to an error correction process;

macro-block correcting means (86) for correcting for an uncorrectable portion which could not be corrected by the macro-block header error correction means according to a proximity macro-block header;

supermacro-block constructing means (74, 78, 84, 88) for linking (de-interleaving) second data other than the first data in the respective block code data to construct a supermacro-block based on the macro-block header information subjected to the error correction by the macro-block header correction means or corrected for by the macro-block correcting means;

supermacro-block error correction means (90) for subjecting a supermacro-block constructed by the supermacro-block constructing means to error correction; and subset element constructing means (92) for dividing and linking the supermacro-block corrected by the supermacro-block error correction means to construct a subset element.

That is, an information reproducing device and an information recording medium can be provided in which since the method of constructing the supermacro-block can be adequately changed according to information in the macro-block header in an information recording medium (paper) in which errors often occur or particularly in a case where data is lost in the block data unit, it becomes possible to suppress attachment of invalid data to minimum and record a larger amount of valid data (the contents of an application file), and as a result, the code pattern can be reproduced with higher reliability and the highly reliable operation can be maintained even if the structure of the code pattern itself is changed in the future.

(3) An information reproducing device according to the information reproducing device of the (1) or (2), wherein the second processing information includes a block address and block code data size; and the block code data linking means includes:

a memory (74) for storing data output from the second hierarchical processing means; and memory control means (78) for calculating a stored memory address of the memory based on the block address and block code data size and storing data into the memory according to the memory address to re-construct the block code data.

That is, it becomes unnecessary to sequentially input block data from the second hierarchical processing means. That is, for example, even if the user scans in the opposite direction when optically reading the code from the information recording medium and block data is input in a reverse order from the second hierarchical processing means, the processes of third hierarchical processing means and the succeeding hierarchical processing means can be correctly effected.

(4) An information reproducing device according to the information reproducing device of the (1) or (2), wherein the second processing information includes a block address, error status flag thereof and block code data size; and the block code data linking means includes:

a memory (74) for storing data output from the second hierarchical processing means;

flag storing means (M) for storing a plurality of address error status flags; and memory control means (78) for calculating a stored memory address of the memory based on the block address and block code data size and controlling storage of data into the calculated memory address according to the address error status flag stored in the flag storing means.

That is, since the process of writing or replacing data is controlled according to the error state (error correction state) of the block address when block data of the same address is repetitively input, the rate of occurrence of errors of block data can be reduced.

(5) An information reproducing device according to the information reproducing device of the (1) or (2), wherein the second processing information includes a block address, error status flag thereof, block code data size and block code data demodulation error number; and the block code data linking means includes:
a memory (74) for storing data output from the second hierarchical processing means;
flag storing means (M) for storing a plurality of address error status flags;
error number storing means (M) for storing a plurality of block code data demodulation error numbers; and
memory control means (78) for calculating a stored memory address of the memory based on the block address and block code data size and controlling storage of data into the calculated memory address according to the address error status flag stored in the flag storing means and the block code data demodulation error number stored in the error number storing means.

That is, since block data is replaced according to the demodulation error number of the block data when the error state of the block address is the same in a case where block data of the same address is repetitively input, the rate of occurrence of errors of block data can be reduced.

(6) An information reproducing device according to the information reproducing device of the (1) or (2), wherein the second processing information includes a block address, error status flag thereof, block code data size and block code data demodulation error position; and
the block code data linking means includes:
a memory (74) for storing data output from the second hierarchical processing means;
flag storing means (M) for storing a plurality of address error status flags;
error position storing means (M) for storing a plurality of block code data demodulation error positions; and
memory control means (78) for calculating a stored memory address of a given unit of the memory based on the block address, block code data size and block code data demodulation error position and controlling storage of data into the calculated memory address for each of the given units according to the address error status flag stored in the flag storing means and the block code data demodulation error position stored in the error position storing means.

That is, since block data is replaced by data of the preset unit or demodulation data unit in the block data according to the demodulation error position of the block data when block data of the same address is repetitively input, the rate of occurrence of errors of block data can be reduced.

(7) An information reproducing device according to the information reproducing device of the (1), wherein the macro-block header is interleaved and has at least one of an error correction check digit and an error detection check digit attached thereto; and
the third hierarchical processing means further includes:
de-interleaving means (80) for de-interleaving the macro-block header information; and
at least one of error correction decoding means (82) for effecting the error correction decoding for the macro-block header de-interleaved by the de-interleaving means and error detection decoding means (82) for detecting the error of the macro-block header de-interleaved by the de-interleaving means or subjected to the error correction decoding by the error correction decoding means.

That is, since the error occurring in the macroblock header can be corrected or detected, the supermacro-block or the subset element can be correctly constructed.

(8) An information reproducing device according to the information reproducing device of the (4), wherein the macro-block header is interleaved and has at least one of an error correction check digit and an error detection check digit attached thereto; and
the third hierarchical processing means further includes:
de-interleaving means (80) for de-interleaving the macro-block header information;
lost position calculating means (78) for calculating an information lost position based on the block address and block address error status flag; and
at least one of error correction decoding means (82) for effecting the error correction decoding for the macro-block header de-interleaved by the de-interleaving means by also using the lost position calculated by the lost position calculating means and error detection decoding means (82) for detecting the error of the macro-block header de-interleaved by the de-interleaving means or subjected to the error correction decoding by the error correction decoding means.

That is, the ability of correcting the error occurring in the macro-block header can be further enhanced.

(9) An information reproducing device according to the information reproducing device of the (6), wherein the macro-block header is interleaved and has at least one of an error correction check digit and an error detection check digit attached thereto; and
the third hierarchical processing means further includes:
de-interleaving means (80) for de-interleaving the macro-block header information;
lost position calculating means (78) for calculating an information lost position based on the block address, block address error status flag and block code data demodulation error position; and
at least one of error correction decoding means (82) for effecting the error correction decoding for the macro-block header de-interleaved by the de-interleaving means by also using the lost position calculated by the lost position calculating means and error detection decoding means (82) for detecting the error of the macro-block header de-interleaved by the de-interleaving means or subjected to the error correction decoding by the error correction decoding means.

That is, the ability of correcting the error occurring in the macro-block header can be further enhanced.

(10) An information reproducing device according to the information reproducing device of the (1), wherein the second data is interleaved and has at least one of an error correction check digit and an error detection check digit attached thereto; and
the third hierarchical processing means further includes:
supermacro-block creating means (88) for de-interleaving the second data to create the supermacro-block; and
at least one of error correction decoding means (90) for effecting the error correction decoding for the supermacro-block created by the supermacro-block creating means and error detection decoding means (90) for detecting the error of the supermacro-block created by the supermacro-block creating means or subjected to the error correction decoding by the error correction decoding means.

That is, occurrence of errors in the subset element can be prevented by correcting the error occurring in the supermacro-block.

(11) An information reproducing device according to the information reproducing device of the (4), wherein the second data is interleaved and has at least one of an error correction check digit and an error detection check digit attached thereto; and the third hierarchical processing means further includes:

supermacro-block creating means (88) for de-interleaving the second data to create the supermacro-block;

lost position calculating means (78) for calculating an information lost position based on the block address and block address error status flag; and at least one of error correction decoding means (90) for effecting the error correction decoding for the supermacro-block created by the supermacro-block creating means by also using the lost position calculated by the lost position calculating means and error detection decoding means (90) for detecting the error of the supermacro-block created by the supermacro-block creating means or subjected to the error correction decoding by the error correction decoding means.

That is, the ability of correcting the error occurring in the supermacro-block can be further enhanced.

(12) An information reproducing device according to the information reproducing device of the (6), wherein the second data is interleaved and has at least one of an error correction check digit and an error detection check digit attached thereto; and the third hierarchical processing means further includes:

supermacro-block creating means (88) for de-interleaving the second data to create the supermacro-block;

lost position calculating means (78) for calculating an information lost position based on the block address, block address error status flag and block code data demodulation error position; and at least one of error correction decoding means (90) for effecting the error correction decoding for the supermacro-block created by the supermacro-block creating means by also using the lost position calculated by the lost position calculating means and error detection decoding means (90) for detecting the error of the supermacro-block created by the supermacro-block creating means or subjected to the error correction decoding by the error correction decoding means.

That is, the ability of correcting the error occurring in the supermacro-block can be further enhanced.

(13) An information reproducing device according to the information reproducing device of the (10), wherein a parameter (118) relating to the interleaving of the second data and a parameter (120; 122) relating to at least one of the error correction check digit and error detection check digit are described in the macro-block header.

That is, since a method of correcting the second data can be described in the macro-block header according to the characteristic of error occurrence in the information recording medium (types of paper), the second data can be subjected to more adequate error correction.

(14) An information reproducing device according to the information reproducing device of the (1) or (2), wherein a parameter (126) for constructing a subset element by collecting a plurality of data items of the given unit obtained after de-interleaving the second data and then subjecting the second data to a error correction or error detection process and a linking parameter (124) for the subset element are described in the macro-block header.

That is, since an error correction method, the size of the subset element corresponding to the structure of the application file and link information can be described in the macro-block header, addition of dummy data can be suppressed to minimum and a larger amount of valid data can be recorded.

(15) An information reproducing device according to the information reproducing device of the (2), wherein the macro-block header is interleaved and has an error correction check digit and an error detection check digit attached thereto;

the micro-block header constructing means includes de-interleaving means (80) for de-interleaving the macro-block header information;

the macro-block header error correction means includes error correction decoding means (82) for effecting the error correction decoding for the macro-block header de-interleaved by the de-interleaving means; and the third hierarchical processing means further includes error detection decoding means (82) for detecting the error of the macro-block header de-interleaved by the de-interleaving means or subjected to the error correction decoding by the error correction decoding means.

That is, since the error occurring in the macro-block header can be corrected or detected, the subset element can be correctly constructed with high reliability.

(16) An information reproducing device according to the information reproducing device of the (4), wherein the third hierarchical processing means further includes lost position calculating means (78) for calculating an information lost position based on the block address and block address error status flag; and the macro-block header error correction means corrects the error of the macro-block header constructed by the macro-block header constructing means by also using the lost position calculated by the lost position calculating means.

That is, the ability of correcting the error occurring in the macro-block header can be further enhanced.

(17) An information reproducing device according to the information reproducing device of the (16), wherein the macro-block header has an error detection check digit attached thereto; and the third hierarchical processing means further includes error detection decoding means (82) for detecting the error of the macro-block header subjected to the error correction by the macro-block header error correction means by also using the lost position calculated by the lost position calculating means.

That is, the ability of correcting the error occurring in the macro-block header can be further enhanced.

(18) An information reproducing device according to the information reproducing device of the (6), wherein the third hierarchical processing means further includes lost position calculating means (78) for calculating an information lost position based on the block address, block address error status flag and block code data demodulation error position; and the macro-block header error correction means corrects the error of the macro-block header constructed by the macro-block header constructing means by also using the lost position calculated by the lost position calculating means.

That is, the ability of correcting the error occurring in the macro-block header can be further enhanced.

(19) An information reproducing device according to the information reproducing device of the (18), wherein the macro-block header has an error detection check digit attached thereto; and the third hierarchical processing means further includes error detection decoding means (82) for detecting the error of the macro-block header subjected to the error correction by the macro-block header error correction means by also using the lost position calculated by the lost position calculating means.

That is, the ability of correcting the error occurring in the macro-block header can be further enhanced.

(20) An information reproducing device according to the information reproducing device of the (2), wherein the second data has an error detection check digit attached thereto; and the third hierarchical processing means further includes:

error detection decoding means (90) for detecting the error of the supermacro-block subjected to the error correction by the supermacro-block error correction means.

That is, occurrence of errors in the subset element can be prevented by correcting the error occurring in the supermacro-block.

(21) An information reproducing device according to the information reproducing device of the (4), wherein the third hierarchical processing means further includes lost position calculating means (78) for calculating an information lost position based on the block address and block address error status flag; and the supermacro-block header error correction means corrects the error of the macro-block constructed by the supermacro-block constructing means by also using the lost position calculated by the lost position calculating means.

That is, the ability of correcting the error occurring in the supermacro-block can be further enhanced.

(22) An information reproducing device according to the information reproducing device of the (21), wherein the second data has an error detection check digit attached thereto; and the third hierarchical processing means further includes error detection decoding means (90) for detecting the error of the supermacro-block subjected to the error correction by the supermacro-block error correction means by also using the lost position calculated by the lost position calculating means.

That is, the ability of correcting the error occurring in the supermacro-block header can be further enhanced.

(23) An information reproducing device according to the information reproducing device of the (6), wherein the third hierarchical processing means further includes lost position calculating means (78) for calculating an information lost position based on the block address, block address error status flag and block code data demodulation error position; and the supermacro-block error correction means corrects the error of the supermacro-block constructed by the supermacro-block constructing means by also using the lost position calculated by the lost position calculating means.

That is, the ability of correcting the error occurring in the macro-block header can be further enhanced.

(24) An information reproducing device according to the information reproducing device of the (23), wherein the second data has an error detection check digit attached thereto; and the third hierarchical processing means further includes error detection decoding means (90) for detecting the error of the supermacro-block subjected to the error correction by the supermacro-block error correction means by also using the lost position calculated by the lost position calculating means.

That is, the ability of correcting the error occurring in the supermacro-block can be further enhanced.

(25) An information reproducing device according to the information reproducing device of the (20), wherein a parameter (118) relating to the interleaving of the second data and a parameter (120; 122) relating to at least one of the error correction check digit and error detection check digit are described in the macro-block header.

That is, since a method of correcting the second data can be described in the macro-block header according to the characteristic of error occurrence in the information recording medium (types of paper), the second data can be subjected to more adequate error correction.

(26) An information recording medium comprising:

a sheet-form medium (30); and an optically readable code pattern (10) corresponding to multimedia information containing at least one of audio information, video information and digital code data recorded on the sheet-form medium;

wherein the code pattern contains processing information necessary for editing data according to a restoring processing procedure of reading the code pattern and restoring original multimedia information, the restoring processing procedure is constructed in a hierarchical form with a given number of hierarchical structures, and the hierarchical structure at least includes:

a first logical hierarchy (layer 5) having a file managing function;

a second logical hierarchy (layer 4) having a function of creating a data transfer unit (sector) treated by the first logical hierarchy (layer 5) by collecting first given data units (subset elements) and creating and converting a second given data unit (subset); and a third logical hierarchy (layer 3 or lower-level layer) having a function of reading the code pattern from the information recording medium, subjecting the code pattern to a given restoring process, and outputting the first given data unit.

That is, a plurality of processing methods or processing parameters can be selected by providing processing information necessary for the restoring processing procedure in the code pattern. Further, the processing method is not limited to a specified processing method, and it becomes extremely easy to effecting the restoring process by additionally using an adequate processing method for dealing with media such as sound and picture or an excellent method which will be developed in the future.

Further, application of an existing file management system can be made simple and the data acquisition method of the application process can be made compatible by constructing a function of forming a readout code pattern in a hierarchical form, effecting the restoring process and matching the same with the specified data structure and transfer process.

(27) An information recording medium according to the information recording medium of the (26), wherein the first logical hierarchy is a specified file management system (MSDOS.SYS/UNIX or the like) for dealing with a specified data unit structure according to a specified procedure.

That is, since readout data can be managed by use of a file management system which is widely used by providing a function of converting a readout code pattern, a lot of labor for creating a file management system can be omitted and the user of the data can easily deal with the data.

(28) An information recording medium according to the information recording medium of the (26), wherein the second logical hierarchy has data matching means (212) for receiving the first given data unit (subset 109 element) output from the third logical hierarchy to create the second preset data unit (subset), converting the same into a specified data transfer unit (sector) dealt with by the first logical hierarchy and matching the converted specified data transfer unit (sector) with a data transfer process corresponding to the specified file management.

That is, it becomes unnecessary for the readout code pattern to have the data structure specified by the file management system and the flexibility in the design of the code pattern structure can be enhanced.

(29) An information recording medium according to the information recording medium of the (26), wherein the second logical hierarchy has means (218; 236) for analyzing an identification code of the data unit (sector) requested from the first logical hierarchy and specifying readout of a corresponding data area.

That is, it is not necessary for the file management system to have any function other then the specified function for data input/output and data to be managed can be easily derived from the code pattern.

(30) An information recording medium according to the information recording medium of the (26), wherein the second logical hierarchy has means (210) for creating an analyzing table of the second given data units (subsets) corresponding to the identification codes of the data units (sectors) requested from the first logical hierarchy.

That is, since the analyzing table for the request of the file management system can be created, the file management can be easily attained with high reliability (that is, desired information can be acquired without fail) even if preset file groups managed by the index are different.

(31) An information recording medium according to the information recording medium of the (27), wherein the data unit (sector) created in the second logical hierarchy includes at least management information (164 to 188) necessary for the file management system.

That is, since information necessary for the data management function (data transfer rule) of the file management system is contained in the code pattern, response can be stably and immediately made when the file management system requests information necessary for he management.

(32) An information recording medium according to the information recording medium of the (27), wherein the second given data unit (subset) created in the second logical hierarchy has the same function (index function) as a function file (such as directory entry) specified by the file management system.

That is, since a file management method specified by the file management system can be realized by providing index information necessary for the file management system is in the code pattern, it is convenient. Further, the index function makes it possible to realize an application for efficiently managing a relatively large number of files or efficiently retrieving a desired file, thus enlarging the range of application of the pattern code.

(33) An information recording medium according to the information recording medium of the (26), wherein a specification name identifier (164) which is previously registered and which can represent part of the file management information in a specified form is set in a head portion of the second given data unit (subset) created in the second logical hierarchy.

That is, the subset specification name identifier makes it possible to omit part of the file management information (subset header) or adequately select the description structure of the file management information. Further, the information can be replaced by a smaller amount of data, attached information can be reduced, and the storage capacity for information data can be increased.

(34) An information recording medium according to the information recording medium of the (26), wherein the second given data unit (subset) created in the second logical hierarchy includes an information code which is data other than the file management information (user data) (194), and given processing information (subset data control header) (192) for controlling the information code.

That is, the process of dealing with the subset data simply as an object to be managed and the process of restoring information as the information code and then dealing with the same as an information unit can be separated by providing the file management information (subset header) and information code management information (subset data control header) in a double structure form. Therefore, the simple file management and the efficient management of information unit by use of the subset data control header can be attained without recognizing the contents of the information.

(35) An information recording medium according to the information recording medium of the (34), wherein the second given data unit (subset) created in the second logical hierarchy includes a name code (190) which is previously registered and which can represent the structure of the given processing information (subset data control header) in a specified form.

That is, the name code (user data format type) makes it possible to omit part of the information (information relating the data compression or the like) for restoration of the information code (user data) and select the description structure of the information code (user data). Further, the information can be replaced by a smaller amount of data, attached information can be reduced, and the storage capacity for information data can be increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproducing device for optically reading a code pattern from an information recording medium which includes a portion in which data regarding multimedia information is recorded in the form of an optically readable code pattern, said multimedia information containing at least one of audio information, video information and digital code data, and for processing the read code pattern to reproduce the multimedia information, where the code pattern is constituted of a given number of blocks which can be arranged adjacent to each other, each of the blocks includes (i) a data pattern formed in accordance with block data constituting part of the data regarding the multimedia information, (ii) a marker for use in recognizing said each of the blocks, and (iii) a block address pattern representing a block address of said each block, and the data pattern, the marker and the block address pattern having a predetermined positional relationship with each other, said information reproducing device comprising:

a memory for storing block data included in each said block, which is obtained when the read code pattern is reproduced;

means for recognizing an error state of the block address of each said block which is obtained when the read code Pattern is processed; and a memory controller for controlling storing of the block data of each said block in the memory in accordance with the error state of the block address of said block, wherein when any one of the blocks is read out a plurality of times, obtaining a plurality of block addresses for said any one of the blocks, the memory controller compares error states of the block addresses with each other, and then performs control such that the memory stores block data associated with one of the block addresses, the state of which is determined to be better than the state of any other block address.

2. An information reproducing device according to claim 1, wherein when the error states of the block addresses are classified into a plurality of kinds, and priority is determined in advance with respect to selection of a plurality of block data associated with the block addresses, the memory controller performs the control such that the memory stores one of the plurality of block data which corresponds to one of the block addresses, the state of which is determined to be better than the state of any other block address, in accordance with the priority.

3. An information reproducing device according to claim 2, wherein the error states of the block addresses include at least two of (i) an error state wherein the block address includes no error, (ii) an error state wherein the block address includes an error, and the error is corrected by error correction processing, (iii) the block address includes an error, the error is not corrected even by the error correction processing, and the block address is corrected based on the block address of an adjacent block, and (iv) the block address includes an error, the error is not corrected even by the error correction processing, and the block address is not corrected even based on the block address of the adjacent block.

* * * * *

UNITED STATES PATENT AND TRADEMARK OFFICE
CERTIFICATE OF CORRECTION

PATENT NO.     : 6,201,902 B1
DATED          : March 13, 2001
INVENTOR(S)    : Hiroshi Sasaki et al.

It is certified that error appears in the above-identified patent and that said Letters Patent is hereby corrected as shown below:

<u>Title page,</u>
Item [76], Inventors, in the sequence of the inventors, put -- Hiroyoshi Fujimori, 5-7-8-203, Minamiosawa, Hachioji-shi, Tokyo; -- after "Shinichi Imade, 717-4, Mokurenji, Iruma-shi, Saitama-ken;";

Insert -- Item [73], Assignee: Olympus Optical Co., Ltd Tokyo (Japan) --;

Item [56], References Cited, under "U.S. PATENT DOCUMENTS" change
"4,461,552     7/1984       Lelvine …….. 352/27" to
-- 4,461,552   7/1984       Levine …….. 352/27 --.

Signed and Sealed this

Ninth Day of July, 2002

Attest:

Attesting Officer

JAMES E. ROGAN
*Director of the United States Patent and Trademark Office*